(12) United States Patent
Munoz et al.

(10) Patent No.: US 11,432,097 B2
(45) Date of Patent: Aug. 30, 2022

(54) USER INTERFACE FOR CONTROLLING AUDIO RENDERING FOR EXTENDED REALITY EXPERIENCES

(71) Applicant: QUALCOMM Incorporated, San Diego, CA (US)

(72) Inventors: Isaac Garcia Munoz, San Diego, CA (US); Siddhartha Goutham Swaminathan, San Diego, CA (US); Nils Günther Peters, San Diego, CA (US); S M Akramus Salehin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/918,492

(22) Filed: Jul. 1, 2020

(65) Prior Publication Data

US 2021/0006925 A1    Jan. 7, 2021

Related U.S. Application Data

(60) Provisional application No. 62/992,624, filed on Mar. 20, 2020, provisional application No. 62/870,577, filed on Jul. 3, 2019.

(51) Int. Cl.
*H04S 7/00* (2006.01)
*H04S 3/00* (2006.01)
*G06F 3/16* (2006.01)

(52) U.S. Cl.
CPC ............ *H04S 7/303* (2013.01); *G06F 3/165* (2013.01); *H04S 3/008* (2013.01); *H04S 7/305* (2013.01)

(58) Field of Classification Search
CPC ............ H04S 2400/11; H04S 2400/01; H04S 2420/01; H04S 7/303; H04S 7/305;
(Continued)

(56) References Cited

U.S. PATENT DOCUMENTS 7,149,691 B2    12/2006    Balan et al.
9,294,853 B1    3/2016    Dhaundiyal
(Continued)

FOREIGN PATENT DOCUMENTS

EP    3343349    *    7/2018
EP    3343349 A1    7/2018
(Continued)

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.
(Continued)

*Primary Examiner* — Norman Yu
(74) *Attorney, Agent, or Firm* — Shumaker & Sieffert, P.A.

(57) ABSTRACT

A device may be configured to play one or more of a plurality of audio streams. The device may include a memory configured to store the plurality of audio streams, each of the audio streams representative of a soundfield. The device also may include one or more processors coupled to the memory, and configured to present a user interface to a user, obtain an indication from a user via the user interface representing a desired listening position; and select, based on the indication, at least one audio stream of the plurality of audio streams.

38 Claims, 28 Drawing Sheets

(58) Field of Classification Search
CPC ...... H04S 3/008; H04S 2400/15; G06F 3/165; G06F 3/011; G06F 3/04815; G06F 3/167
USPC .......................................... 381/300, 17, 307
See application file for complete search history.

(56) References Cited

U.S. PATENT DOCUMENTS

| | | | |
|---|---|---|---|
| 9,466,278 | B2 | 10/2016 | Rosedale et al. |
| 10,484,811 | B1* | 11/2019 | Mindlin .................. H04S 3/008 |
| 2011/0249821 | A1 | 10/2011 | Jaillet et al. |
| 2018/0088900 | A1* | 3/2018 | Glaser ................... G06F 3/0482 |
| 2018/0349088 | A1* | 12/2018 | Leppanen ........... G06F 3/04815 |
| 2019/0007781 | A1 | 1/2019 | Peters et al. |
| 2019/0198028 | A1 | 6/2019 | Kim et al. |
| 2019/0253826 | A1* | 8/2019 | Grosche ................... H04R 5/04 |
| 2020/0089466 | A1 | 3/2020 | Eronen et al. |

FOREIGN PATENT DOCUMENTS

| | | | |
|---|---|---|---|
| JP | 6263098 | B2 | 1/2018 |
| WO | 2018064528 | A1 | 4/2018 |
| WO | 2018077379 | A1 | 5/2018 |
| WO | WO 2019/072984 | * | 4/2019 |

OTHER PUBLICATIONS

Bianchi et al., "The Ray Space Transform: A New Framework for Wave Field Processing", IEEE Transactions on Signal Processing, vol. 64, No. 21, Nov. 1, 2016, pp. 5696-5706.
ETSI TS 103 589 V1.1.1, "Higher Order Ambisonics (HOA) Transport Format", Jun. 2018, 33 pages.
Herre, et al., "MPEG-H 3D Audio—The New Standard for Coding of Immersive Spatial Audio," IEEE Journal of Selected Topics in Signal Processing, vol. 9, No. 5, Aug. 2015, 10 pp.
Hollerweger F., "An Introduction to Higher Order Ambisonic," Oct. 2008, pp. 13, Accessed online [Jul. 8, 2013].
"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.
"Information technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.
"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.
ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].
Markovic et al., "Multiview Soundfield Imaging in the Projective Ray Space", IEEE/ACM Transactions on Audio, Speech, and Language Processing, 2015, 13 Pages.
Patricio et al., "Toward Six Degrees of Freedom Audio Recording and Playback Using Multiple Ambisonics Sound Fields", Audio Engineering Society, Convention Paper 10141, Presented at the 146th Convention Mar. 20-23, 2019, Dublin, Ireland, pp. 1-9.
Peterson J., et al., "Virtual Reality, Augmented Reality, and Mixed Reality Definitions," EMA, version 1.0, Jul. 7, 2017, 4 pp.
Pezzoli et al., "Estimation of the Sound Field at Arbitrary Positions in Distributed Microphone Networks Based on Distributed Ray Space Transform", IEEE, 2018, pp. 186-190.
Plinge et al., "Enhanced Immersion for Binaural Audio Reproduction of Ambisonics in Six-Degrees-of-Freedom: The Effect of Added Distance Information", ICSA Ilmenau, Audio Labs, Sep. 27, 2019, 23 Pages.
Poletti M.A., "Three-Dimensional Surround Sound Systems Based on Spherical Harmonics", The Journal of the Audio Engineering Society, vol. 53, No. 11, Nov. 2005, pp. 1004-1025.
Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.
Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.
Sen D., et al., "Technical Description of the Qualcomm's HoA Coding Technology for Phase II", 109. MPEG Meeting; Jul. 7, 2014-Nov. 7, 2014; SAPPORO; (Motion Picture Expert Group or ISO/IEC JTC1/SC29/WG11), No. m34104, Jul. 2, 2014 (Jul. 2, 2014), 4 Pages, XP030062477, figure 1.
Tylka et al., "Fundamentals of a Parametric Method for Virtual Navigation Within an Array of Ambisonics Microphones", Journal of the Audio Engineering Society, vol. 68, No. 3, Mar. 2020, pp. 120-137.
Tylka et al., "Soundfield Navigation using an Array of Higher-Order Ambisonics Microphones", Audio Engineering Society, Conference Paper, Presented at the Conference on Audio for Virtual and Augmented Reality Sep. 30-Oct. 1, 2016, Los Angeles, CA, USA, pp. 1-10.
Tylka J.G., et al., "Comparison of Techniques for Binaural Navigation of Higher-Order Ambisonic Soundfields", AES Convention 139; Oct. 2015, AES, 60 East 42nd Street, Room 2520, New York 10165-2520, USA, Oct. 23, 2015 (Oct. 23, 2015), 13 Pages, XP040672273, the whole document.
Zheng X., "Soundfield Navigation Separation Compression and Transmission", University of Wollongong, 2013, 254 Pages.
International Search Report and Written Opinion—PCT/US2020/040679—ISA/EPO—dated Oct. 20, 2020, 12 pp.
International Preliminary Report on Patentability—PCT/US2020/040679—ISA/EPO—dated Jan. 1, 2022, 7 pp.

* cited by examiner

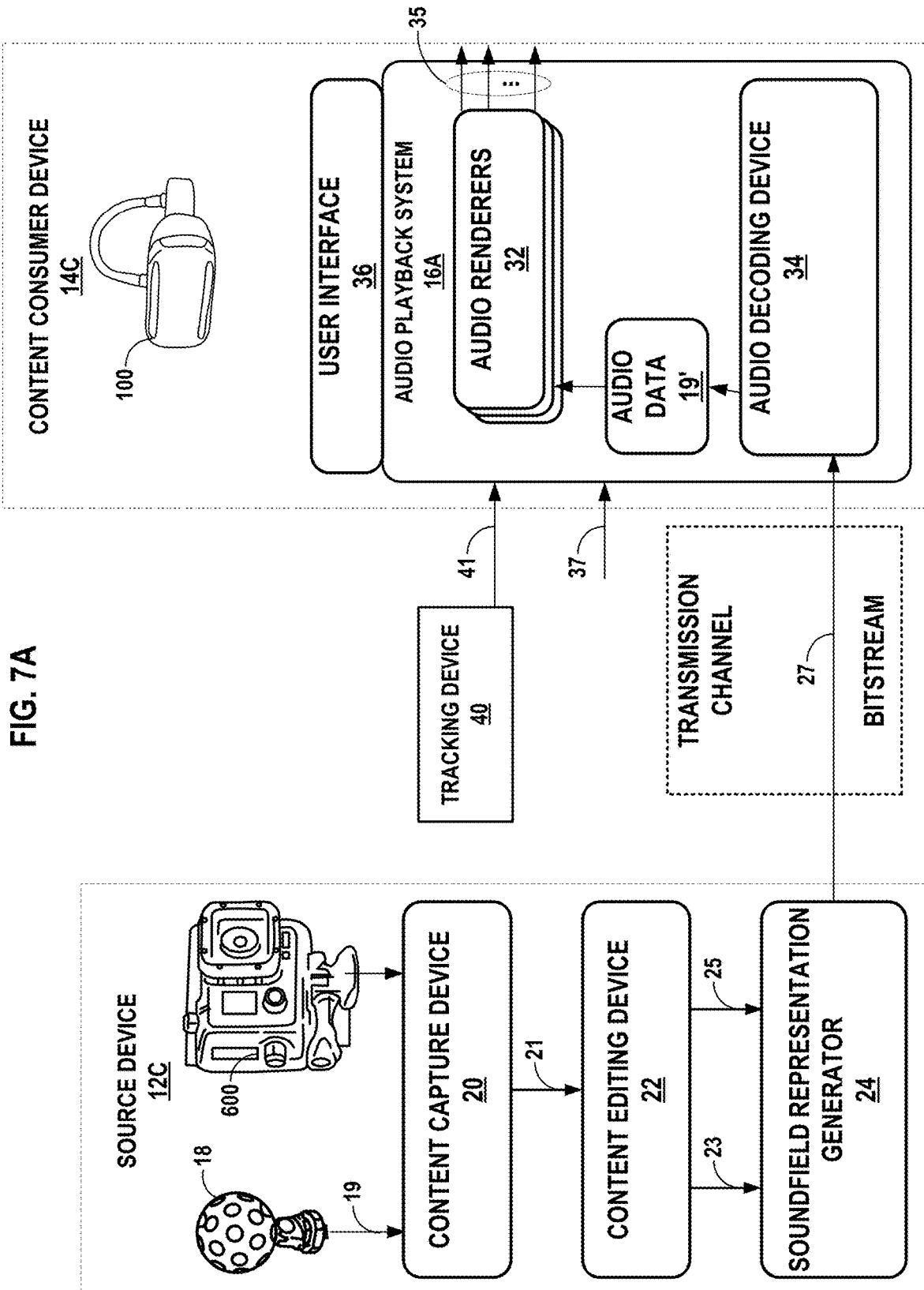

USER INTERFACE FOR CONTROLLING AUDIO RENDERING FOR EXTENDED REALITY EXPERIENCES

CROSS-REFERENCE TO RELATED APPLICATIONS

This application claims priority to U.S. Provisional Patent Application 62/870,577, filed on Jul. 3, 2019, and to U.S. Provisional Patent Application 62/992,624, filed on Mar. 20, 2020, the entire content of which is incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems is generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for user control of audio rendering of an acoustical space for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. An example of an outdoor environment could include a car, buildings, walls, a forest, etc. An acoustical space may be an example of an acoustical environment and may be an indoor space or an outdoor space. As used herein, an audio element is either a sound captured by a microphone (e.g., directly captured from near-field sources or reflections from far-field sources whether real or synthetic), or a sound field previously synthesized, or a mono sound synthesized from text to speech, or a reflection of a virtual sound from an object in the acoustic environment.

In one example, various aspects of the techniques are directed to a device configured to play one or more of a plurality of audio streams, the device comprising: a memory configured to store the plurality of audio streams, each of the audio streams representative of a soundfield; and one or more processors coupled to the memory, and configured to: present a user interface to a user; obtain an indication from the user via the user interface representing a desired listening position; and select, based on the indication, at least one audio stream of the plurality of audio streams.

In another example, various aspects of the techniques are directed to a method comprising: storing, by a memory, a plurality of audio streams, each of the audio streams representative of a soundfield, the memory being communicatively coupled to one or more processors; presenting, by the one or more processors, a user interface; obtaining, by the one or more processors, via the user interface, an indication representing a desired listening position; selecting, by the one or more processors and based on the indication, at least one audio stream of the plurality of audio streams.

In another example, various aspects of the techniques are directed to a device configured to play one or more of a plurality of audio streams, the device comprising: means for storing the plurality of audio streams, each of the audio streams representative of a soundfield; means for presenting a user interface; means for obtaining, via the user interface, an indication representing a desired listening position; and means for selecting, based on the indication, at least one audio stream of the plurality of audio streams.

In another example, various aspects of the techniques are directed to a non-transitory computer-readable storage medium having stored thereon instructions that, when executed, cause one or more processors to: store a plurality of audio streams, each of the audio streams representative of a soundfield; present a user interface; obtain, via the user interface, an indication representing a desired listening position; and select, based on the indication, at least one audio stream of the plurality of audio streams.

The details of one or more examples of this disclosure are set forth in the accompanying drawings and the description below. Other features, objects, and advantages of various aspects of the techniques will be apparent from the description and drawings, and from the claims.

BRIEF DESCRIPTION OF DRAWINGS

FIGS. 7A and 7B are diagrams illustrating other example systems that may perform various aspects of the techniques described in this disclosure.

DETAILED DESCRIPTION

Figure 1A:
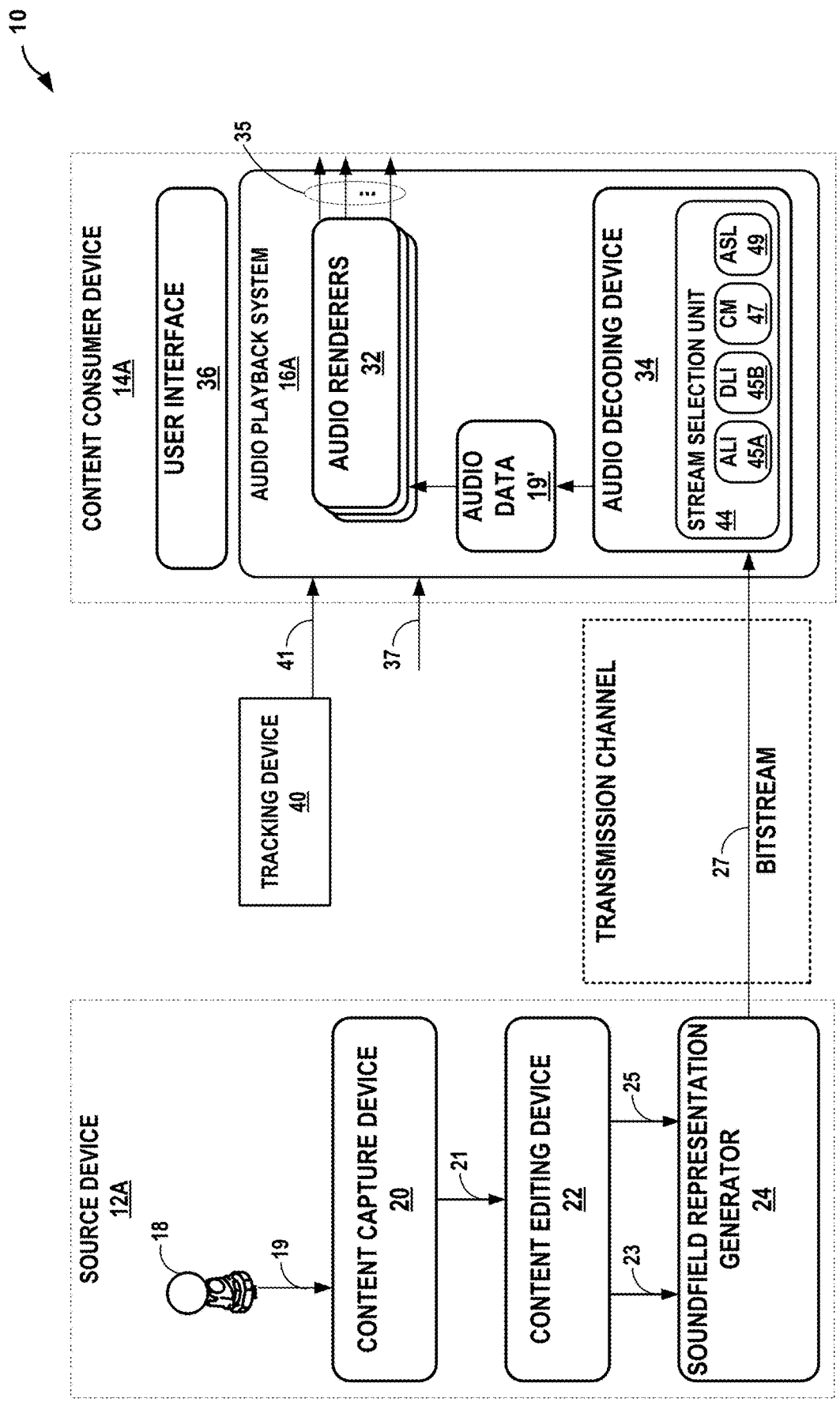
FIGS. 1A-1C are diagrams illustrating systems that may perform various aspects of the techniques described in this disclosure.

Users in an AR/VR/MR world are unable to select a desired listening position, e.g., where to source an audio stream(s). The techniques of this disclosure may enable a user to indicate to a user interface of a device a desired listening position and the device may select at least one audio stream of a plurality of audio streams based on the indication. In this manner, the techniques of this disclosure may enable an enhanced audio experience where a user may select a desired listening position and the device may provide the audio experience for the user as if the user were located at the desired listening position. For example, the techniques of this disclosure may provide an enhanced audio experience in a concert or a sporting event environment, where the user may select a desired listening position near the stage, away from the stage, on the home team's bench, in the press box, etc.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield. The techniques described in this disclosure may apply to any of the following formats, including scene-based audio formats, channel-based audio formats, object-based audio formats, or any combination thereof.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (e.g., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k) = g(\omega)(-4\pi i k) h_n^{(2)}(kr_s) Y_n^{m*}(\theta_s, \varphi_{ps}),$$

where i is $\sqrt{-1}$, $h_n^{(2)}(\bullet)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$ Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of three-dimensional (3D) coordinates), and the above represents the transformation from individual objects to a representation of the overall soundfield, in the vicinity of the observation point $\{r_r, \theta_r, \varphi_r\}$.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate 3D localization of sound sources within the soundfield. As such, XR devices may render the ambisonic coefficients to speaker feeds that, when played via one or more speakers, accurately reproduce the soundfield.

As another example, the ambisonic coefficients may be translated (e.g., rotated) to account for user movement without overly complex mathematical operations, thereby potentially accommodating the low latency requirements of XR. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR devices may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user or viewed as would be done when normally using the mobile device. As such, any information on the screen can be part of the mobile device. The mobile device may be able to provide tracking information and thereby allow for both a VR experience (when head mounted) and a normal experience to view the displayed world, where the normal experience may still allow the user to view the displayed world providing a VR-lite-type experience (e.g., holding up the device and rotating or translating the device to view different portions of the displayed world). Additionally, while a displayed world is mentioned in various examples of the present disclosure, the techniques of this disclosure may also be used with an acoustical space that does not correspond to a displayed world or where there is no displayed world.

Figure 1B:
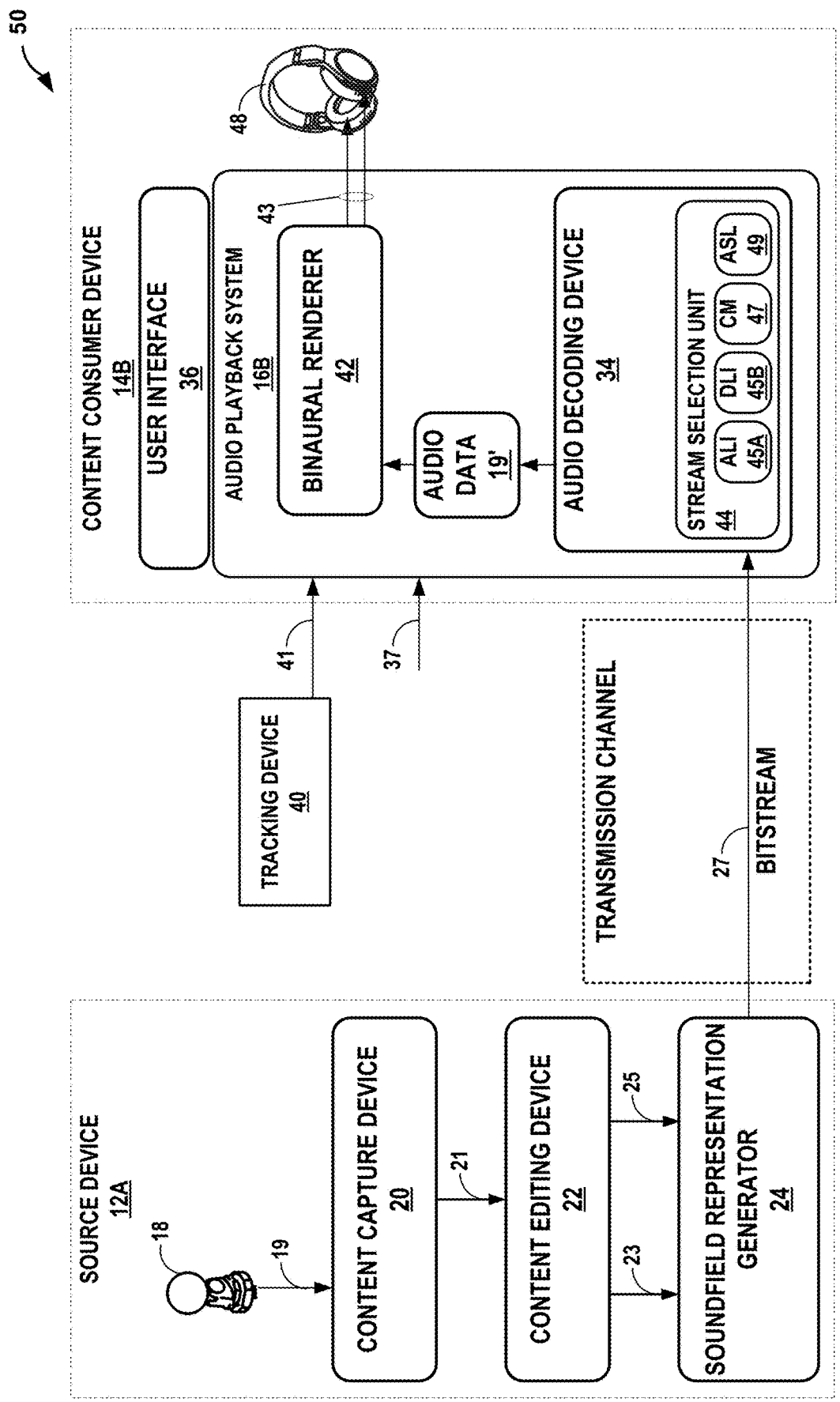
Figure 1C:
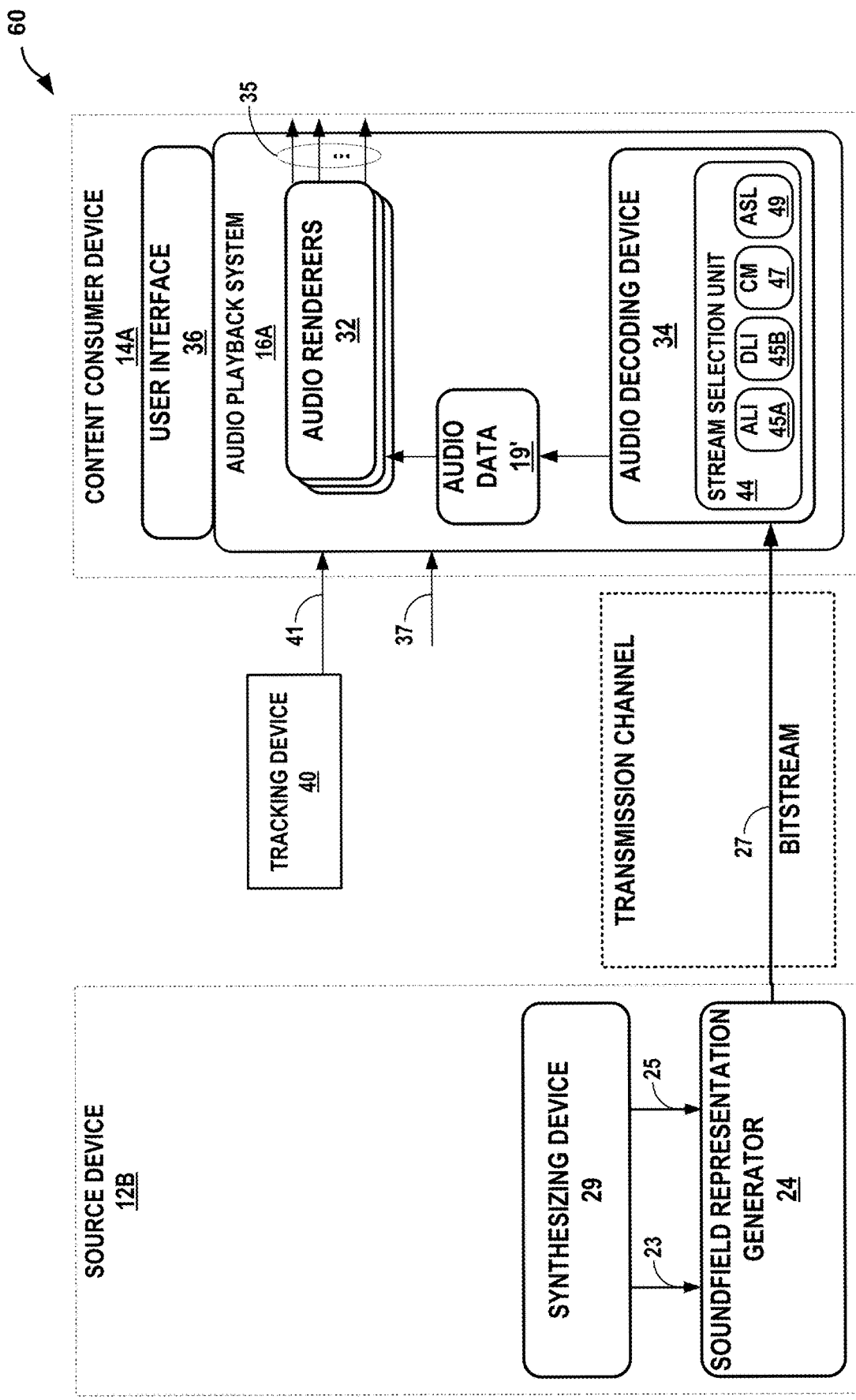

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data. Moreover, the source device 12A may represent any form of computing device capable of generating the representation of a soundfield and is generally described herein in the context of being a VR content creator device. Likewise, the content consumer device 14A may represent any form of computing device capable of implementing rendering metadata techniques described in this disclosure as well as audio playback and is generally described herein in the context of being a VR client device.

The source device 12A may be operated by an entertainment company or other entity that may generate mono and/or multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19. Audio data 19 may represent an audio stream or include an audio stream.

The content capture device 20 may, in some examples, include an integrated microphone 18 that is integrated into the housing of the content capture device 20. In other examples, the microphone 18 is a physically separate device from the content capture device 20. The content capture device 20 may interface wirelessly (e.g., via Wi-Fi, Bluetooth™ or a mobile connection) or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). In other examples, the content editing device 22 is a physically separate device from content capture device 20. The content editing device 22 may represent a unit configured to edit or otherwise alter content 21 received from content capture device 20, including the audio data 19. The content editing device 22 may output edited content 23 and associated metadata 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19, and metadata 25 provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield and the audio metadata 25.

For instance, to generate the different representations of the soundfield using ambisonic coefficients (which again is one example of the audio data 19), soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 or the content editing device 22 and the soundfield representation generator 24, the content capture device 20 or the content editing device may provide content in various forms, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX-HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or first order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19 and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14A may be operated by an individual and may represent a VR client device. Although described with respect to a VR client device, content consumer device 14A may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14A. As shown in the example of FIG. 1A, the content consumer device 14A includes an audio playback system 16A, which may refer to any form of audio playback system capable of rendering the audio data for playback as mono and/or multi-channel audio content.

The content consumer device 14A may include a user interface (UI) 36. The USER INTERFACE 36 may include one or more input devices and one or more output devices. The output devices may include, for example, one or more speakers, one or more display devices, one or more haptic devices, or the like, that are configured to output information for user perception. The output devices may be integral to the content consumer device 14A or may be separate devices coupled to the content consumer device.

The one or more input devices may include any suitable device with which a user may interact to provide inputs to the content consumer device 14A. For example, the one or more input devices may include a microphone, a mouse, a pointer, a game controller, a remote, a touch screen, a linear slider potentiometer, a rocker switch, a button, a wheel, a knob, or the like. In examples in which the one or more user input devices include a touch screen, the touch screen may allow selection of one or more capture device representations based on a single touch input (e.g., touching, swiping, tapping, long pressing, and/or circling an area of a graphical user interface). In some implementations, the touch screen may allow multi-touch input. In these examples, the touch screen may allow selection of the multiple areas of a graphical user interface based on multiple touch inputs.

While shown in FIG. 1A as being directly transmitted to the content consumer device 14A, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may include a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14A, requesting the bitstream 27.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanisms). In any event, the techniques of this disclosure should not therefore be limited in this respect to the example of FIG. 1A.

As noted above, the content consumer device 14A includes the audio playback system 16A. The audio playback system 16A may represent any system capable of playing back mono and/or multi-channel audio data. The audio playback system 16A may include a number of different audio renderers 32. The audio renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or "both A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). The audio decoding device 34 may be part of the same physical device as the audio renderers 32 or may be part of a physically separate device and be configured to communicate via a wireless or wired connection with audio renderers 32. Again, the audio data 19' may include scene-based audio data that in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Application Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19', but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data or channel-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds may refer to other types of rendering, such as rendering incorporated directly into the decoding of the audio data from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translational movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 capable of performing binaural rendering using one or more head-related transfer functions (HRTFs) or the other functions capable of rendering to left and right speaker feeds 43.

The audio playback system 16B may output the left and right speaker feeds 43 to headphones 48, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

FIG. 1C is a block diagram illustrating another example system 60. The example system 60 is similar to the example system 10 of FIG. 1A, but source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
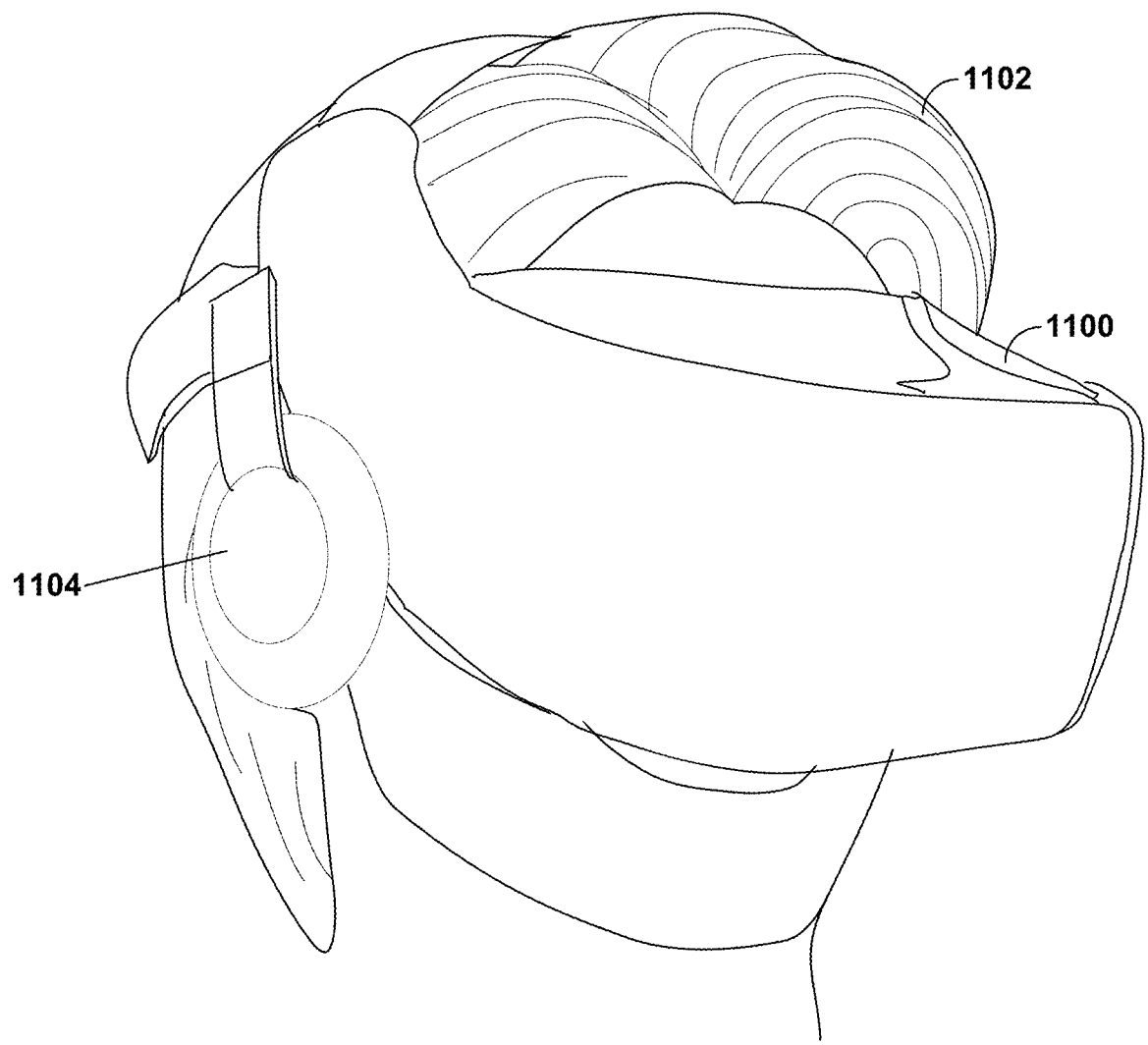
FIG. 2 is a diagram illustrating an example of a VR device worn by a user.

As described above, the content consumer device 14A or 14B (for simplicity purposes, either of which may hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR headset 1100 worn by a user 1102. The VR headset 1100 is coupled to, or otherwise includes, headphones 1104, which may reproduce a soundfield represented by the audio data 19' through playback of the speaker feeds 35. The speaker feeds 35 may represent an analog or digital signal capable of causing a membrane within the transducers of headphones 1104 to vibrate at various frequencies, where such process is commonly referred to as driving the headphones 1104.

Video, audio, and other sensory data may play important roles in the VR experience. To participate in a VR experience, the user 1102 may wear the VR headset 1100 (which may also be referred to as a VR client device 1100) or other wearable electronic device. The VR client device (such as the VR headset 1100) may include a tracking device (e.g., the tracking device 40) that is configured to track head movement of the user 1102, and adapt the video data shown via the VR headset 1100 to account for the head movements, providing an immersive experience in which the user 1102 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 1102 to reside in the virtual world visually, often the VR headset 1100 may lack the capability to place the user in the displayed world audibly. In other words, the VR system (which may include a computer responsible for rendering the video data and audio data—that is not shown in the example of FIG. 2 for ease of illustration purposes, and the VR headset 1100) may be unable to support full three-dimension immersion audibly (and in some instances realistically in a manner that reflects the displayed scene presented to the user via the VR headset 1100).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 1102 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world providing a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move from one location to another location within the concert or sporting event. In some examples, as a user moves from one location to another location, stream selection unit 44 may select at least one different audio stream than previously selected streams.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (either of which, for simplicity purposes, is hereinafter referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and microphones, privacy may become an issue, as users may not want to live streams fully available to the public.

In the context of streaming application (live or recorded), there may be a large number of audio streams associated with varying levels of quality and/or content. The audio streams may represent any type of audio data, including scene-based audio data (e.g., ambisonic audio data, including FOA audio data, MOA audio data and/or HOA audio data), channel-based audio data, and object-based audio data. Selecting only one of a potentially large number of audio streams from which to recreate a soundfield may not provide an experience that ensures an adequate level of immersion. However, selecting multiple audio streams may create distractions due to different spatial localization between the multiple audio streams, thereby potentially reducing immersion.

In accordance with some techniques described in this disclosure, the audio decoding device 34 may adaptively select between audio streams available via the bitstream 27 (which are represented by the bitstream 27 and hence the bitstream 27 may also be referred to as "audio streams 27"). The audio decoding device 34 may select between different audio streams of the audio streams 27 based on audio location information (ALI) (e.g., 45A in FIGS. 1A-1C) which may be stored in memory and which, in some examples, may be included as metadata accompanying the audio streams 27. The ALI 45A may be representative of a capture location in a displayed world or auditory space at which the corresponding one of the audio streams 27 was captured, e.g., by microphones 18, or virtual coordinates where the audio stream was synthesized. In some examples, the ALI 45A may be associated with coordinates of the displayed world or an auditory space. The audio decoding device 34 may select, based on the ALI 45A, a subset of the audio streams 27, where the subset of the audio streams 27 excludes at least one of the audio streams 27. The audio decoding device 34 may output the subset of audio streams 27 as audio data 19' (which may also be referred to as "audio data 19").

In addition, the audio decoding device 34 may obtain the tracking information 41, which the content consumer device 14 may translate into device location information (DLI) (e.g., 45B in FIGS. 1A-1C). The DLI 45B may represent a virtual location or actual location of the content consumer device 14 in the displayed world or an auditory space. In some examples, the DLI 45B may be associated with coordinates of the displayed world or auditory space. The content consumer device 14 may provide the DLI 45B to the audio decoding device 34. The audio decoding device 34 may then select, based on the ALI 45A and the DLI 45B, the audio data 19' from the audio streams 27. The audio playback system 16A may then reproduce, based on the audio data 19', the corresponding soundfields.

In this respect, the audio decoding device 34 may adaptively select a subset of the audio streams 27 to obtain the audio data 19' that may result in a more immersive experience (compared to selecting a single audio stream or all of the audio data 19'). As such, various aspects of the techniques described in this disclosure may improve operation of the audio decoding device 34 (and the audio playback system 16A or 16B and the content consumer device 14) itself by possibly enabling the audio decoding device 34 to better spatialize sound sources within the soundfield and thereby improve immersion.

In operation, the audio decoding device 34 may interface with one or more source devices 12 to determine the ALI 45A for each of the audio streams 27. As shown in the example of FIG. 1A, the audio decoding device 34 may include a stream selection unit 44, which may represent a unit configured to perform various aspects of the audio stream selection techniques described in this disclosure.

The stream selection unit 44 may generate, based on the ALI 45A, a constellation map (CM) 47. The CM 47 may define the ALI 45A for each of the audio streams 27. The stream selection unit 44 may also perform an energy analysis with respect to each of the audio streams 27 to determine an energy map for each of the audio streams 27, storing the energy map along with the ALI 45A in the CM 47. The energy maps may jointly define an energy of a common soundfield represented by the audio streams 27.

The stream selection unit 44 may next determine a distance between the location represented by the DLI 45B and the capture location or synthesis location represented by the ALI 45A associated with at least one and possible each of the audio streams 27. The stream selection unit 44 may then select, based on the at least one and possibly each of the distance(s), the audio data 19' from the audio streams 27 as discussed in more detail below with respect to FIGS. 3A-3D.

Further, in some examples, the stream selection unit 44 may also select, based on the energy maps stored to the CM 47, the ALI 45A, and the DLI 45B (jointly where the ALI 45A and the DLI 45B are presented in the form of the above noted distances, which may also be referred to as "relative distances"), the audio data 19' from the audio streams 27. For example, the stream selection unit 44 may analyze the energy maps presented in the CM 47 to determine an audio source location (ASL) 49 of an audio source in the common soundfield emitting sound that is captured by microphones (such as the microphone 18) and represented by the audio streams 27. The stream selection unit 44 may then determine, based on ALI 45A, the DLI 45B, and the ASL 49, the audio data 19' from the audio streams 27. More information regarding how the stream selection unit 44 may select the streams is discussed below with respect to FIGS. 3A-3D.

In accordance with some techniques described in this disclosure, the content consumer device 14 may be configured to output for display a graphical user interface (GUI) via USER INTERFACE 36. The GUI may include a visual representation of the CM 47. The USER INTERFACE 36 may enable a user to select and control various aspects or parameters of the soundfield, and the stream selection unit 44 may be configured to select at least one audio stream of audio streams 27 based on user input. For example, the user interface 36 may display a GUI that includes audio element representations associated with coordinates of the displayed world or auditory space. The audio element representations may be indications of content capture devices 20, microphones 18, synthesized soundfields, or combinations thereof, and may be based on ALI 45A. For example, the audio element representations may include icons, images, alphanumeric representations, or combinations thereof, that represent the audio elements.

The user interface 36 also may be configured to obtain or detect an indication representing user input selecting one or more of the audio element representations. In some examples, the user input may indicate direct selection of the one or more audio element representations. In other examples, the user input may indicate indirect selection of the one or more audio element representations, e.g., by the user input defining a zone on the GUI enclosing one or more of the audio element representations. The user may define an arbitrary zone using user input (e.g., the zone may have any shape and/or size), or may manipulate a predetermined zone (e.g., by adjusting a size of a zone having a predetermined and fixed shape). Any audio element representations enclosed by the zone may be interpreted as being selected and any audio element representations outside the zone may be interpreted as not being selected.

The stream selection unit 44 may be configured to select at least one audio stream of the audio streams 27 based on the indication representing the user input. In some examples, the stream selection unit 44 may select at least two audio streams and may be configured to combine the at least two audio streams to form a third audio stream. Stream selection unit 44 may combine the at least two audio streams using mixing, interpolation, or the like, and the relative contribution of each of the at least two audio streams may be based on, for example, the ALI 45A associated with the respective audio streams 27, the DLI 45B, the distance between the location represented by the DLI 45B and the capture location or synthesis location represented by the ALI 45A associated with at least one and possible each of the audio streams 27, and/or the metadata 25.

The audio decoding device 34 may be configured to then output the audio data 19' based on the selection. The audio decoding device 34 may output the audio data 19' to integrated audio renderers 32, audio renderers 32 that are part of a physically separate device, or a storage device. In this way, various aspects of the techniques described in this disclosure may improve operation of the audio decoding device 34 (and the audio playback system 16A and the content consumer device 14) itself by possibly enabling a user to control aspects of the soundfield by selecting content devices and associated audio streams that contribute to the soundfield. More information regarding how the stream selection unit 44 may select the streams based on user input is discussed below with respect to FIGS. 4A-4E.

Figure 3A:
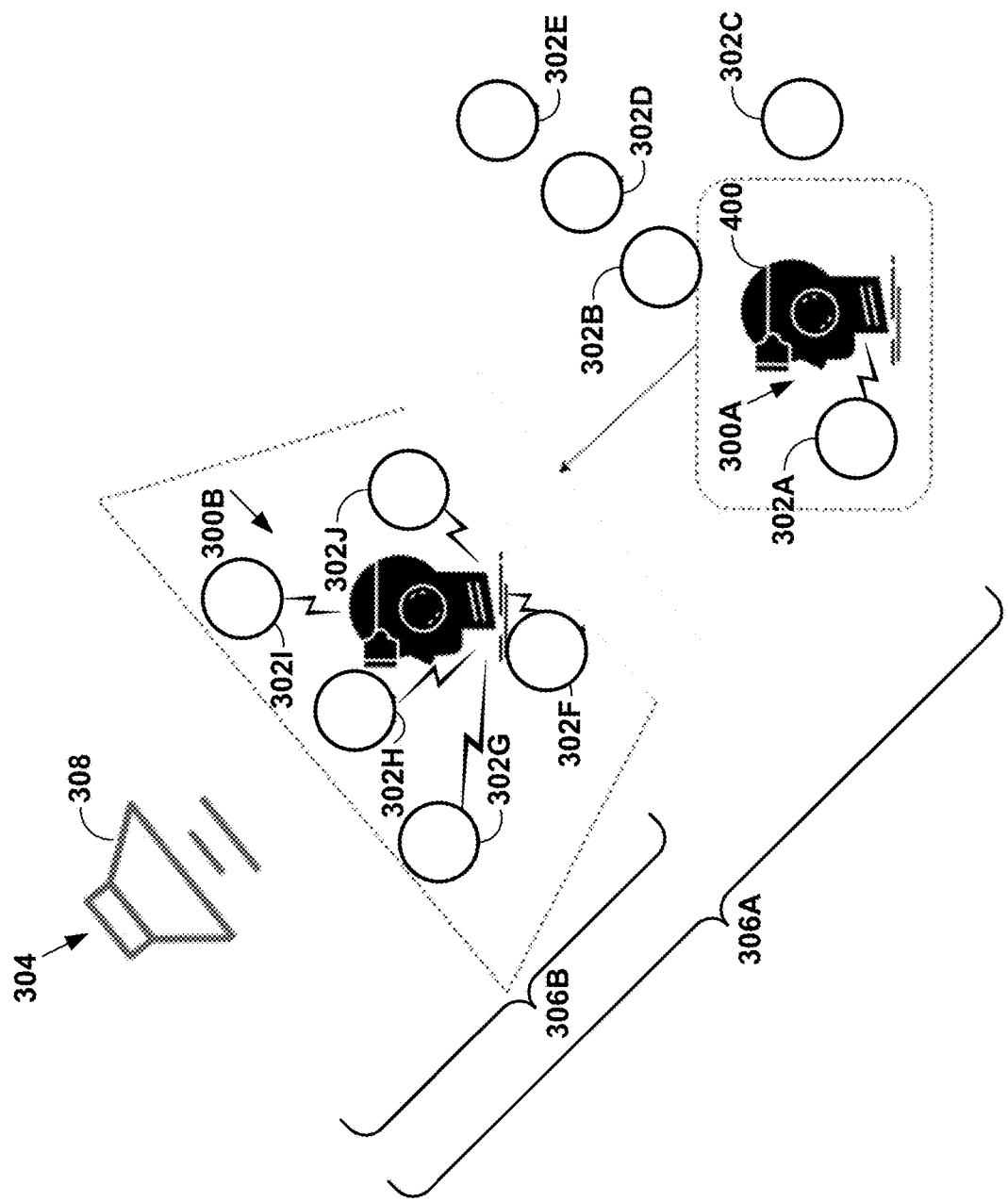
FIGS. 3A-3D are diagrams illustrating, in more detail, example operations of the stream selection unit shown in the example of FIGS. 1A-1C.

FIGS. 3A-3D are diagrams illustrating, in more detail, example operation of the stream selection unit 44 shown in the example of FIG. 1A. As shown in the example of FIG. 3A, the stream selection unit 44 may determine that the DLI 45B indicates that the content consumer device 14 (shown as the VR headset 1100) is at virtual location 300A. The stream selection unit 44 may next determine the ALI 45A for one or more of audio elements 302A-302J (collectively referred to as audio elements 302), which may represent not just microphones, such as the microphone 18 shown in FIG. 1A, but other types of capture devices, including other XR devices, mobile phones—including so-called smartphones—and the like, or synthesized soundfield).

The stream selection unit 44 may next obtain energy maps in the manner described above, analyzing the energy maps to determine the audio source location 304, which may represent one example of the ASL 49 shown in the example of FIG. 1A. The energy maps may denote audio source location 304 as the energy at the audio source location 304 may be higher than the surrounding area. Given that each of the energy maps may denote this higher energy, the stream selection unit 44 may triangulate, based on the higher energy in the energy maps, the audio source location 304.

Next, the stream selection unit 44 may determine an audio source distance 306A as a distance between the audio source location 304 and the virtual location 300A of the VR headset 1100. The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user 1102.

In any event, the stream selection unit 44 may select, when the audio source distance 306A is greater than the audio source distance threshold (which is assumed in this example for purposes of illustration), a single audio stream of the audio streams 27 of the audio elements 302A-302J ("audio elements 302") (e.g., the audio stream of the audio element 302A in the example of FIG. 3A). The stream selection unit 44 may output the corresponding one of the audio streams 27, which the audio decoding device 34 may decode and output as the audio data 19'.

Assuming that the user moves from the virtual location 300A to the virtual location 300B, the stream selection unit 44 may determine an audio source distance 306B as a distance between the audio source location 304 and the virtual location 300B. The stream selection unit 44 may again compare the audio source distance 306B to the audio source distance threshold. The stream selection unit 44 may select, when the audio source distance 306 is less than or equal than the audio source distance threshold (which is assumed in this example for purposes of illustration), multiple audio streams of the audio streams 27 of the audio elements 302A-302J ("audio elements 302"). The stream selection unit 44 may output the corresponding audios streams 27, which the audio decoding device 34 may decode and output as the audio data 19'.

The stream selection unit 44 may also determine a proximity distance between the virtual location 300A and one or more (and possibly each) of the capture locations represented by the ALI 45A to obtain one or more proximity distances. The stream selection unit 44 may then compare the one or more proximity distances to a threshold proximity distance. The stream selection unit 44 may select, when the one or more proximity distances are greater than the threshold proximity distance, a smaller number of the audio streams 27 compared to when the proximity distance is less than or equal to the threshold proximity distance to obtain the audio data 19'. However, the stream selection unit 44 may select, when the one or more of the proximity distances are less than or equal to the threshold proximity distance, a larger number of the audio streams 27 compared to when the proximity distance is less than or equal to the threshold proximity distance to obtain the audio data 19'.

In other words, the stream selection unit 44 may attempt to select those of the audio streams 27 such that the audio data 19' are most closely aligned to the virtual location 300B and surround the virtual location 300B. The proximity distance threshold may define such a threshold, which the user 1100 may set or the stream selection unit 44 may again determine dynamically based on a quality of the audio elements 302F-302J, the gain or loudness of the audio source 308, tracking information 41 (e.g., to determine whether the user is facing the audio source 308), or any other factors.

Figure 3B:
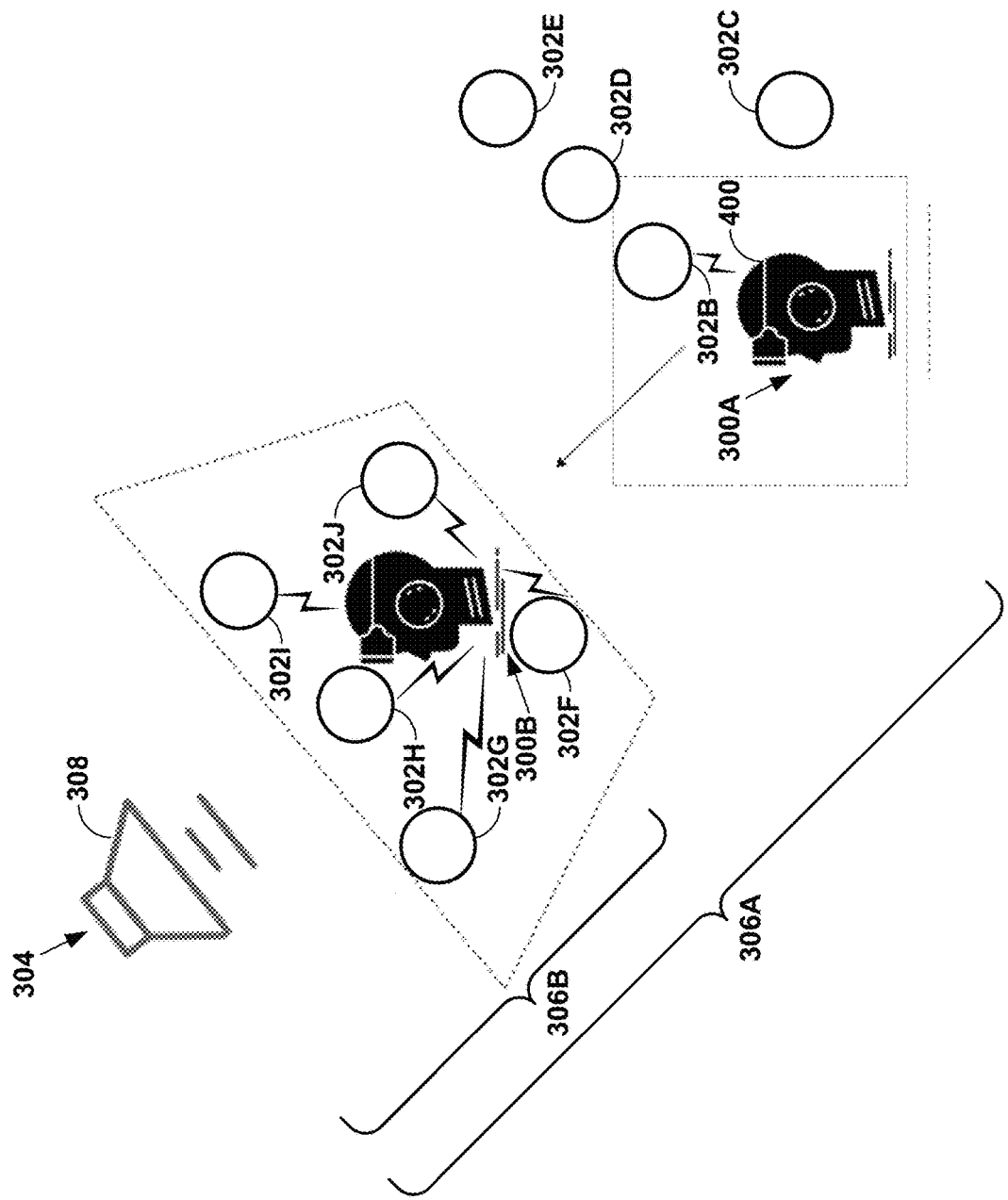

Referring next to the example of FIG. 3B, the stream selection unit 44 may determine that the audio stream of the audio element 302A is corrupted, noisy, or unavailable. The stream selection unit 44 may remove the audio stream from the CM 47 and reiterate through the audio streams 27 in accordance with the techniques described in more detail above to select a single one of the audio streams 27 (e.g., the audio stream of the audio element 302B in the example of FIG. 3B) given that the audio source distance 306A is greater than the audio source distance threshold.

Figure 3C:
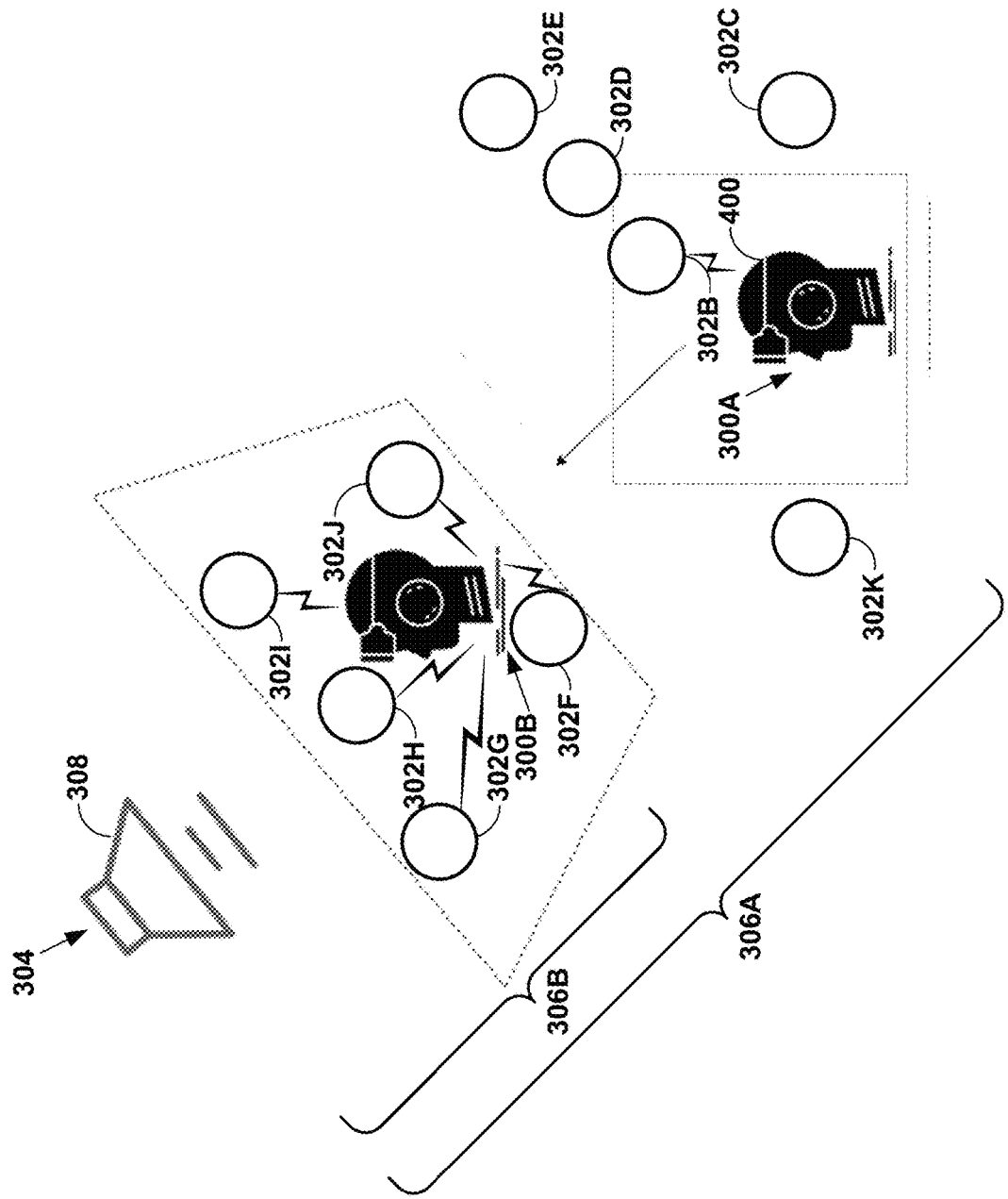

Referring next to the example of FIG. 3C, the stream selection unit 44 may obtain a new audio stream (audio stream of the audio element 302K) and corresponding new audio metadata that includes ALI 45A. The stream selection unit 44 may add the new audio stream to the CM 47 representative of the audio streams 27. The stream selection unit 44 may then reiterate through the audio streams 27 in accordance with the techniques described in more detail above to select a single one of the audio streams 27 (e.g., the audio stream of the audio element 302B in the example of FIG. 3C) given that the audio source distance 306A is greater than the audio source distance threshold.

Figure 3D:
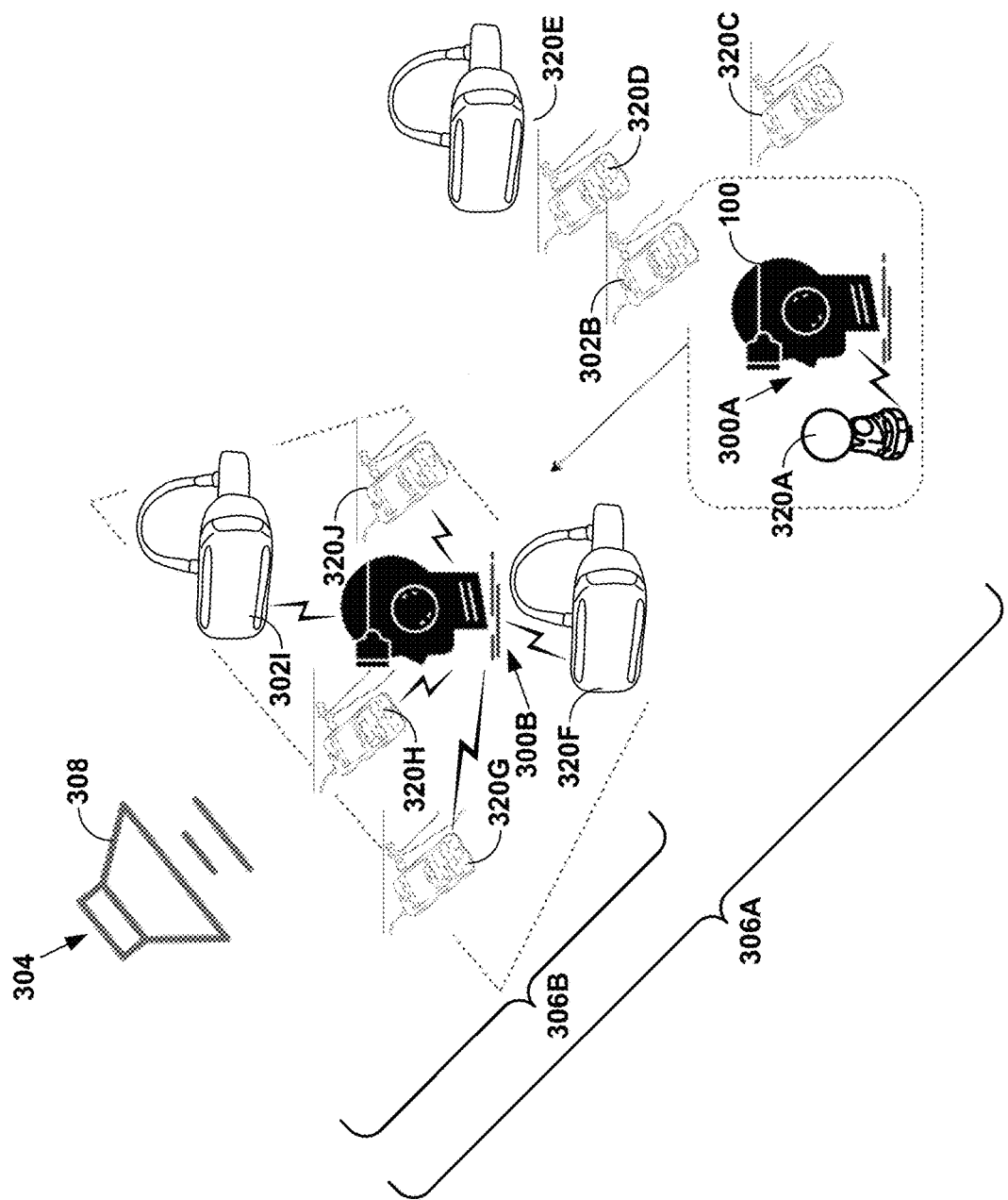

In the example of FIG. 3D, the audio elements 302 are replaced with specific example devices 320A-320J ("devices 320"), where device 320A represents a dedicated microphone 320A, while devices 320B, 320C, 320D, 320G, 320H, and 320J represent smartphones. The devices 320E, 320F, and 320I may represent VR devices. Each of devices 320 may include microphones, which capture audio streams 27 that are selected in accordance with various aspects of the stream selection techniques described in this disclosure.

FIGS. 4A-4E are diagrams illustrating, in more detail, example operation of the content consumer device 14 shown in the example of FIG. 1A. In some examples, user interface 36 may include a graphical user interface (GUI) 402A for display at a display device 404. While the user interface 36 is primarily discussed herein as being a GUI, any type of user interface may be used according to the techniques of this disclosure. For example, user interface 36 may include a touch-based user interface, a voice command-based user interface, a gesture-based user interface, a mouse, a keyboard, a joystick, or any other type of user interface. The display device 404 may be part of the user interface 36 of the content consumer device 14 (e.g., display device 404 may be part of a VR headset 1100 of FIG. 2 or a mobile computing device) or may be a separate device (e.g., display device 404 may be a monitor connected to a content consumer device 14 via a wired or wireless connection).

In some examples, the display device 404 may include a touch sensor that may detect touch input (e.g., single touch input or multi-touch input). In some configurations, the touch sensor may be integrated with the display device 404. In other configurations, the touch sensor may be implemented separately in the content consumer device 14 or may be coupled to the content consumer device 14 and/or display device 404.

Figure 4A:
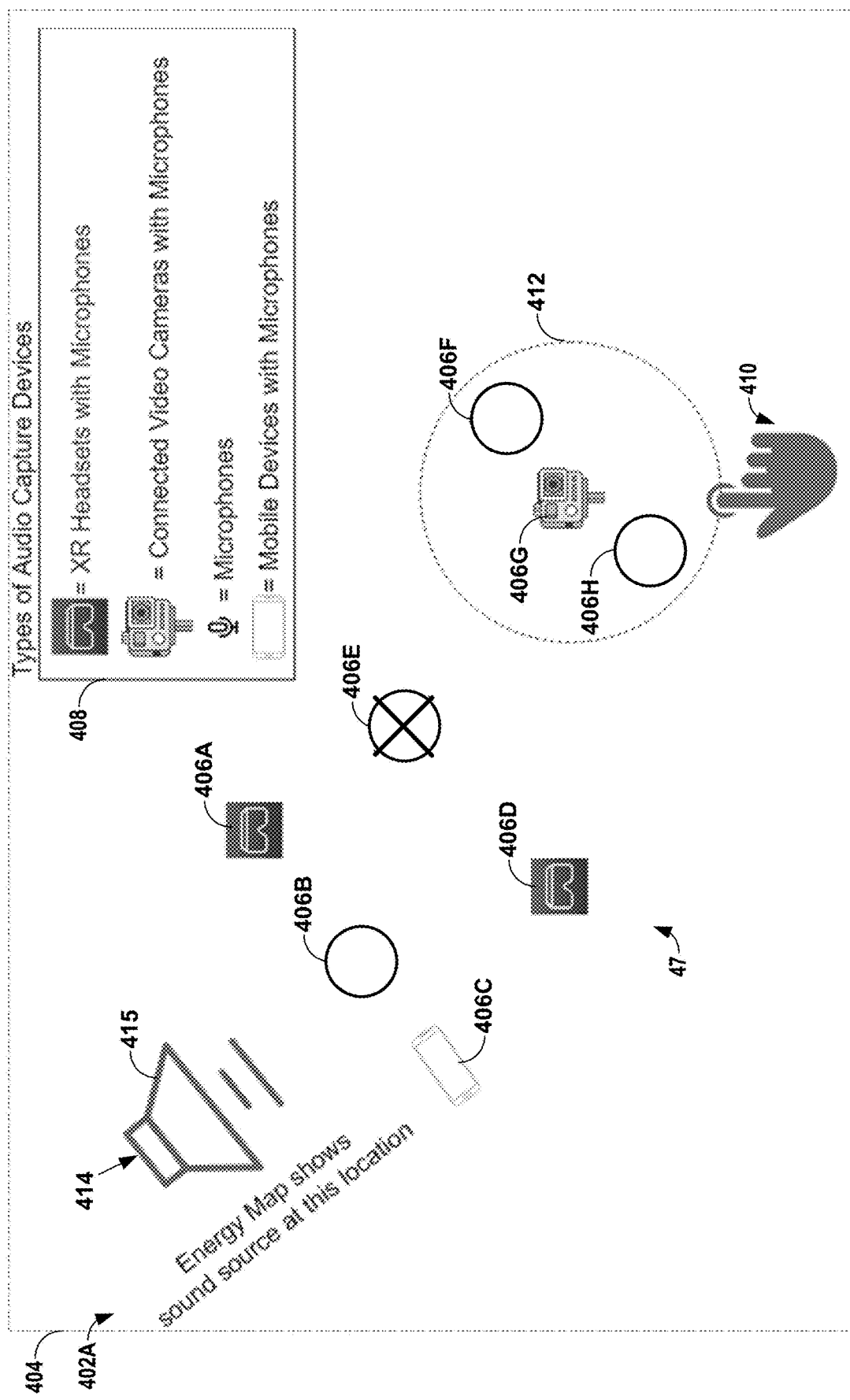
FIGS. 4A-4E are diagrams illustrating, in more detail, example operations of a user interface the content consumer device shown in the example of FIGS. 1A-1C.

The GUI 402A may include a two-dimensional or three-dimensional representation of CM 47, which may include a plurality of audio element representations 406A-406H (collectively, "audio element representations 406"). In some examples, one or more of audio element representations 406 may be represent a synthesized audio stream, rather than a captured audio stream. The audio element representations 406 may be indications of content capture devices 20, microphones 18, synthesized soundfields, or combinations thereof, and may be based on ALI 45A. For example, the audio element representations 406 may include icons, images, alphanumeric representations, or combinations thereof, that represent the audio elements. In some examples, the GUI 402A include a legend 408 that associates icons or images with labels to assist a user in understanding the meaning of the icons or images for the audio element representations 406. As shown in FIG. 4A, the audio elements associated with the audio element representations 406 may include microphones, mobile devices with microphones, XR headsets with microphones, connected video cameras with microphones, synthesized soundfields, or the like.

The audio element representations 406 may be associated with coordinates (e.g., an (x,y,z) coordinate tuple) of the displayed world or an auditory space via the ALI 45A. In some examples, as shown in FIG. 4A, the audio element representations 406 may be arranged in the GUI 402A with a spatial relationship representing relative positions of the respective audio elements within the displayed world or auditory space. In some examples, the GUI 402A may include a representation of the audio element representations 406 displayed within the displayed world or auditory space based on the ALI 45A.

In some examples, the user interface 36 may align all or part of the GUI 402A with a reference plane. In some implementations, the reference plane may be horizontal (e.g., parallel to ground or a floor). For example, the user interface 36 may align part of the GUI 402A that displays a coordinate system associated with the displayed world or auditory space. In some implementations, the user interface 36 may align all or part of the GUI 402A in real time.

In some configurations, the content consumer device 14 (e.g., user interface 36) may include at least one image sensor. For example, several image sensors may be included within the content consumer device 14. The at least one image sensor may collect data relating to the content consumer device 14 and/or an environment in which the content consumer device is located (e.g., image data). For example, a camera (e.g., an image sensor) may generate an image. In some implementations, the at least one image sensor may provide image data to the display device 404.

In some examples, the GUI 402A may include a representation of an energy map and/or a location of the audio source 415. In some examples, the energy map may be a composite determined from the energy maps associated with multiple and possibly each of audio streams 27. The energy map may denote audio source location 414 as the energy at the audio source location 414 may be higher than the surrounding area. Given that each of the energy maps may denote this higher energy, the stream selection unit 44 may triangulate, based on the higher energy in the energy maps, the audio source location 414.

The user interface 36 may include one or more elements configured to carry out the functions described herein. For example, the GUI 402A may include an indicator of a selected audio element representation(s) 406 and/or may display icons for editing a selected audio element representation(s) 406.

The GUI 402A may include an audio element representation selection feature that may allow selection of at least one audio element representation of the audio element representations 406. In some implementations, the audio element representation selection feature may operate based on touch input. For example, the audio element representation selection feature may allow selection of an audio element representation based on a single touch input (e.g., touching, swiping and/or circling an area of the GUI 402A corresponding to a audio element representation). Examples of touch inputs include one or more taps, swipes, patterns (e.g., symbols, shapes, etc.), pinches, spreads, multi-touch rotations, etc. In some configurations, the one or more processor of the content consumer device 14 may select a displayed audio element representation when one or more taps, a swipe, a pattern, gesture, etc., intersects with the displayed audio element representation. In some implementations, the audio element representation selection feature may allow selection of multiple sectors at the same time. For example, the audio element representation selection feature may allow selection of the multiple audio element representations 406 based on multiple touch inputs. As another example, the audio element representation selection feature may allow selection of the multiple audio element representations 406 based on the listener 410 defining a zone 412 via a user input.

A zone 412 may correspond to a set of coordinates, e.g., in a displayed world as defined by the listener 410 via a user input. In some examples, the zone 412 may have a pre-defined shape (e.g., circular) and the listener 410 may manipulate the size of the zone 412 by touch input (e.g., a touch and drag input, a pinch, or a touch input at a location corresponding to an icon or slider for adjusting the size of the zone). In other examples, the zone 412 may be fully definable by the listener 410, including the shape and size of the zone 412. The user interface 36 may select a displayed audio element representation when a pattern (e.g., a circular area, rectangular area or area within a pattern), etc., fully or partially surrounds or includes the displayed audio element representation. The user interface 36 may be configured to interpret audio element representations within the zone 412 (e.g., audio element representations 406F-406H) as being selected and audio element representations outside of the zone 412 (e.g., audio element representations 406A-406E as not being selected.

In some configurations, the audio decoding device 34 may edit one or more audio streams 27 associated with selected audio element representations based on one or more user inputs. For example, the user interface 36 may present one or more options (e.g., one or more buttons, one or more sliders, a drop-down menu, etc.) that provide options for editing the audio stream associated with a selected audio element representation selected audio signal indicator. The listener 410 may edit the selected audio streams by for example, assigning more importance to a audio element representation or zone 412 compared to another audio element representation or zone 412. For example, the content consumer device 14 may obtain an importance indication from listener 410. Audio decoding device 34 (e.g., stream selection unit 44) may assign a higher weight (e.g., gain) to the audio streams indicated by the listener 410 to be more important and may assigned a lower weight (e.g., gain) to audio streams indicated by the listener 410 to be less important or not associated with an importance. Additionally or alternatively, the user interface 36 may present one or more options (e.g., one or more buttons, a drop-down menu, etc.) that provide options for editing the sector (e.g., selecting or changing a color, pattern and/or image for the sector, setting whether audio signals in the sector should be filtered (e.g., blocked or passed), zooming in or out on the sector, adjusting sector size (by expanding or contracting the sector, for example), etc.). For instance, a pinch touch input may correspond to reducing or narrowing sector size, while a spread may correspond to enlarging or expanding sector size.

The stream selection unit 44 then may select at least one audio stream of audio streams 27 based on the selected audio element representations 406. For example, the stream selection unit 44 may select audio streams associated with selected audio element representations 406 and may omit or not select audio streams associated with audio element representations 406 that are not selected. In some examples, stream selection unit 44 may combine two or more of the selected audio streams to produce audio data 19'. For example, stream selection unit 44 may combine two or more of the selected audio streams using mixing, interpolation, or the like, and the stream selection unit 44 may base the relative contribution of each of the at least two audio streams on, for example, the ALI 45A associated with the respective audio streams 27, the DLI 45B, the distance between the location represented by the DLI 45B and the capture location or synthesis location represented by the ALI 45A associated with at least one and possible each of the audio streams 27, and/or the metadata 25.

Figure 4B:
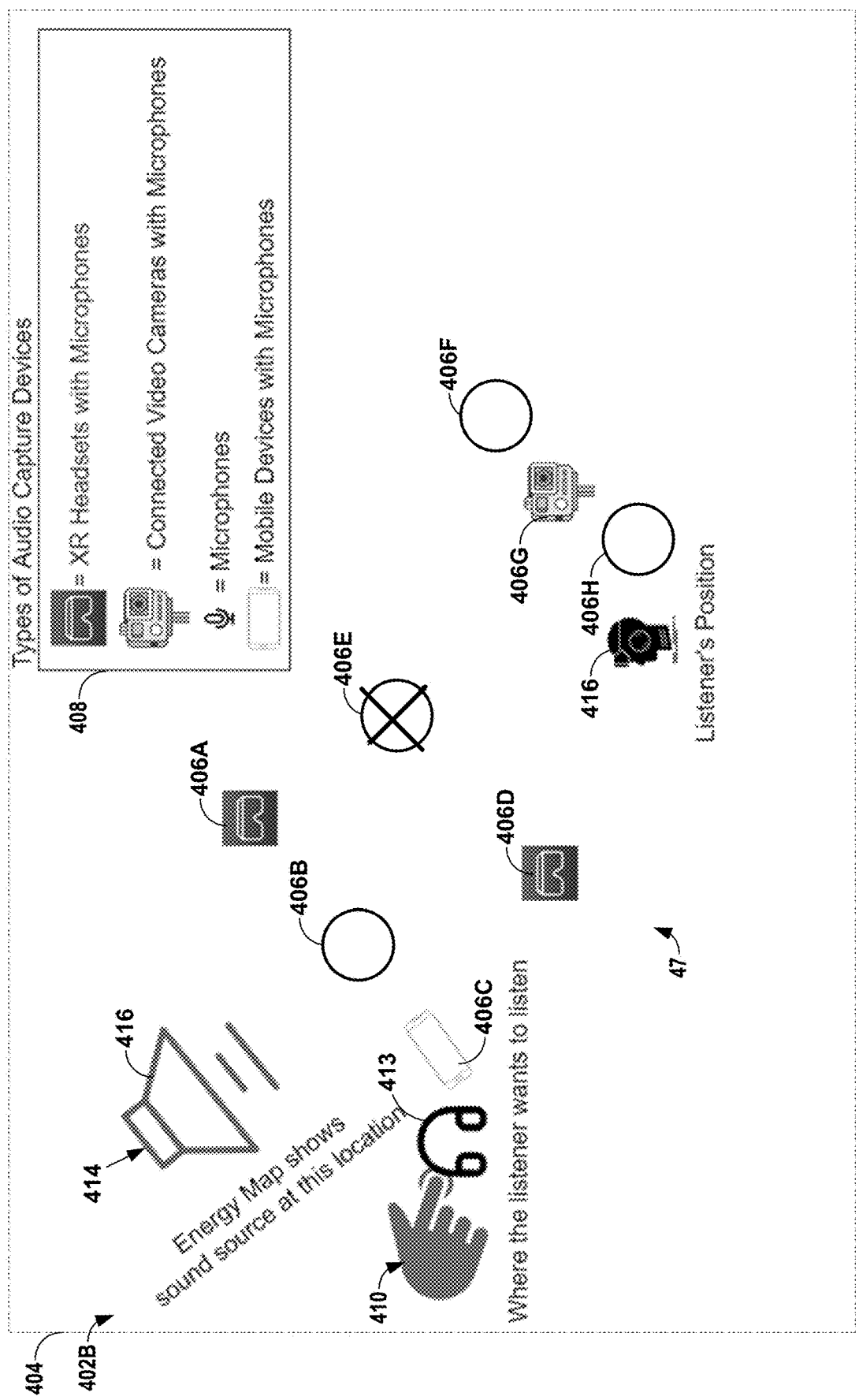

In some examples, the listener 410 may use the user interface 36 to indicate a different listening position than the DLI 45B indicates. For example, FIG. 4B illustrates a GUI 402B in which the listener 410 indicates a desired listening position 413 that is different from the position 416 of the listener 410 within the displayed world or auditory space, as indicated by DLI 45B. The location of the listener 410 may continue to be tracked in 3DoF, 3DoF+, or 6DoF, but their audio perspective may be disassociated from their tracked location. The listener 410 may indicate the desired listening position 413 using any of the user inputs described herein, including single touch inputs, multi-touch inputs, or other, non-touch user inputs. Alternatively, the desired listening position 413 may be a single one of audio element representations 406, and the one or more processors may lock the listening position to the location of the selected audio element, moving the listening position as the selected audio element moves. Stream selection unit 44 then may select audio streams 27 based on the coordinates associated with the desired listening position 413 and techniques described herein, e.g., with reference to FIGS. 1A-1C and 3A-3D.

Figure 4C:
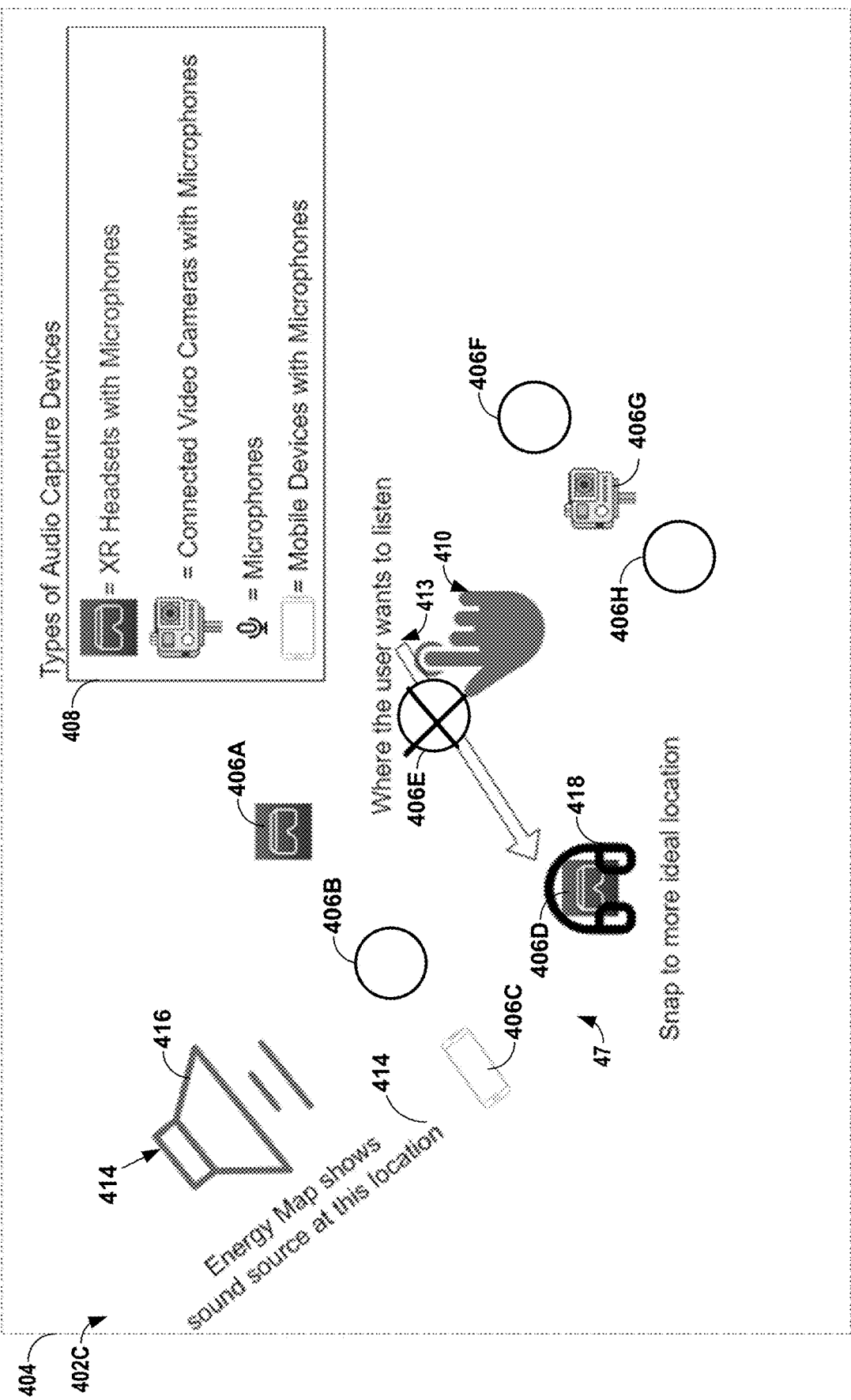

In some implementations, the user interface 36 is configured to possibly suggest an alternative listening position in response to obtaining the indication representing the desired listening position. For example, FIG. 4C illustrates a GUI 402C in which the listener 410 indicates a desired listening position 413. The one or more processors of the content consumer device 14 obtain an indication of the desired listening position 413, e.g., from a touch sensor, and determine that the desired listening position 413 is at an undesirable location. For example, the desired listening position 413 may be near an audio element representation 406E that is muted or whose audio stream is otherwise unavailable for use. In response, the user interface 36 may be configured to output a user interface element suggesting an alternative listening position 418. The audio decoding device 34 (e.g., stream selection unit 44) may determine the alternative listening position 418 based on available audio streams 27, metadata 25 associated with the audio streams, or the like. For example, the metadata may indicate a make, model, or other information for the audio element, and the audio decoding device 34 may select the alternative listening position 418 taking into account quality metrics associated with the audio element. In this way, the one or more processors of the content consumer device 14 may "snap" the desired listening position 413 to a preferred listening position in response to determining that the desired listening position 413 is not preferred. The listener 410 may the indicate acceptance of the alternative listening position 418 (e.g., by affirmative user input or by not inputting a subsequent desired listening position 413) or may input a subsequent desired listening position 413.

Figure 4D:
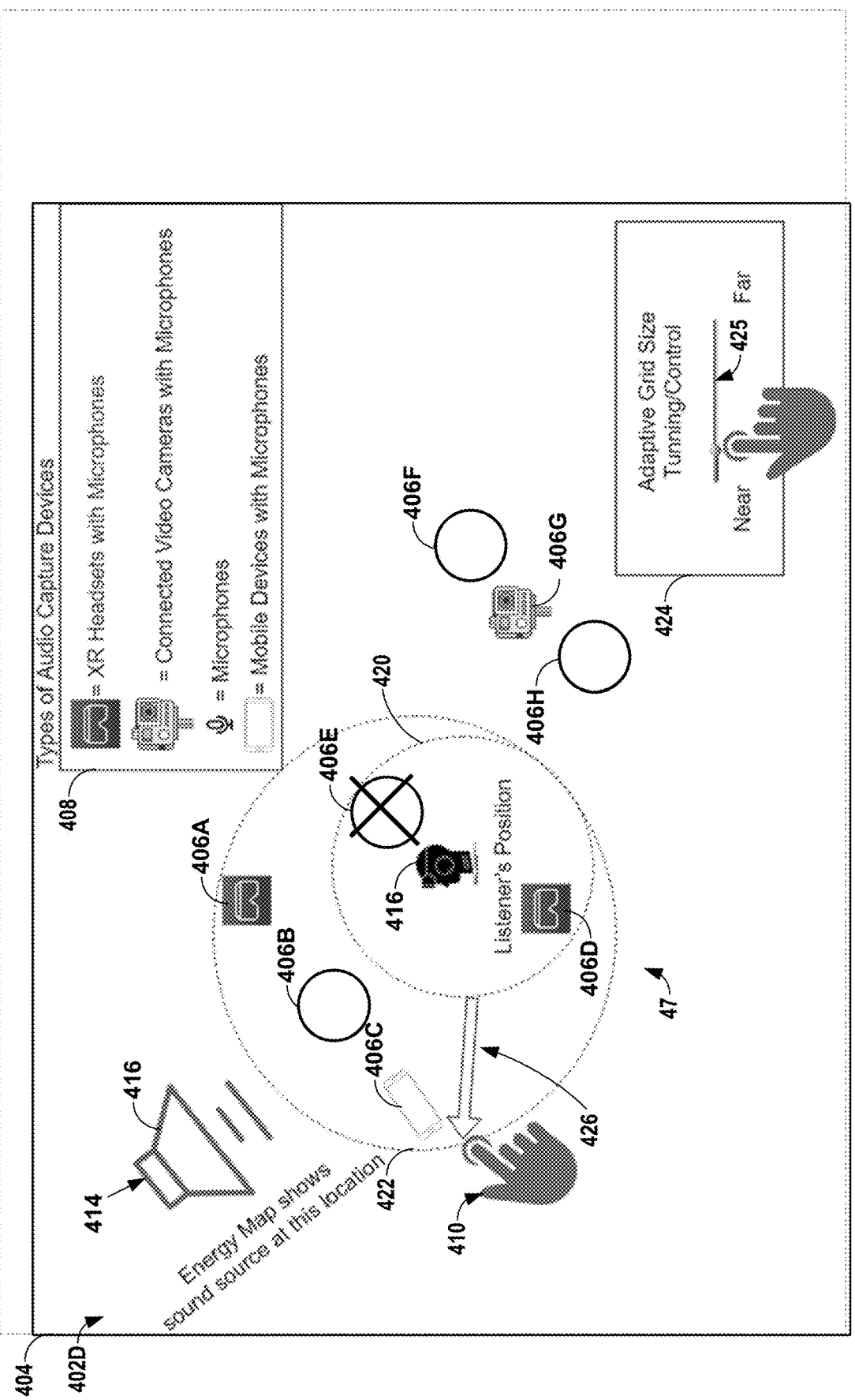

In some implementations, the user interface 36 is configured to allow a user to control or modify a relative perspective of a listening experience. For example, FIG. 4D illustrates a GUI 402D in which the listener 410 indicates a desired listening perspective. GUI 402D illustrates the position 416 of the listener 410 within the displayed world or auditory space, as indicated by DLI 45B. GUI 402D also illustrates a first listening perspective 420. The first listening perspective 420 is relatively focused or narrow, as indicated by the relatively small size of the circle indicating the first listening perspective 420. As a result of the first listening perspective 420 being relatively small, stream selection unit 44 may select only audio streams associated with the audio element representations 406 within the first listening perspective 420. This includes audio element representations 406D and 406E in the example of FIG. 4D. However, the audio element associated with audio element representation 406E is muted or otherwise unavailable, as indicated by the slash through audio element representation 406E. Thus, the stream selection unit 44 may use select only the audio stream associated with audio element representation 406D.

The listener 410 may modify the relative perspective of the listening experience to be wider or more distant. For example, the listener 410 may gesture 426 or otherwise manipulate the graphical user interface element that represents listening perspective to move the listening perspective from the first listening perspective 420 to a second listening perspective 422. Alternatively, the user may interact with another graphical user interface element 424 to move a slider 425 along a continuum between near and far to define the listening perspective. As another example, the user may interact with a mechanical under input device, such as a linear potentiometer, a knob, a dial, or the like, to control the relatively listening perspective.

In response to detecting the user input that controls or modifies the relative listening perspective, stream selection unit 44 may select at least one audio stream from audio streams 27. For example, stream selection unit 44 may select audio streams associated with the audio element representations 406 enclosed or otherwise indicated by the second listening perspective 422. In the example of FIG. 4D, the audio element representations 406 enclosed or otherwise indicated by the second listening perspective 422 include audio element representations 406A-406E, although the stream selection unit 44 may not select the audio stream associated with audio element representation 406E as described above. In other example, rather than selecting audio streams based on the audio element representations 406 enclosed or otherwise indicated by the second listening perspective 422, the stream selection unit 44 may select audio streams 27 based on the second listening perspective 422 and the techniques described herein, e.g., with reference to FIGS. 1A-1C and 3A-3D. For example, the second listening perspective may define the threshold proximity distance, with a "far" perspective corresponding to a larger threshold proximity distance and a "near" perspective corresponding to a smaller threshold proximity distance.

Figure 4E:
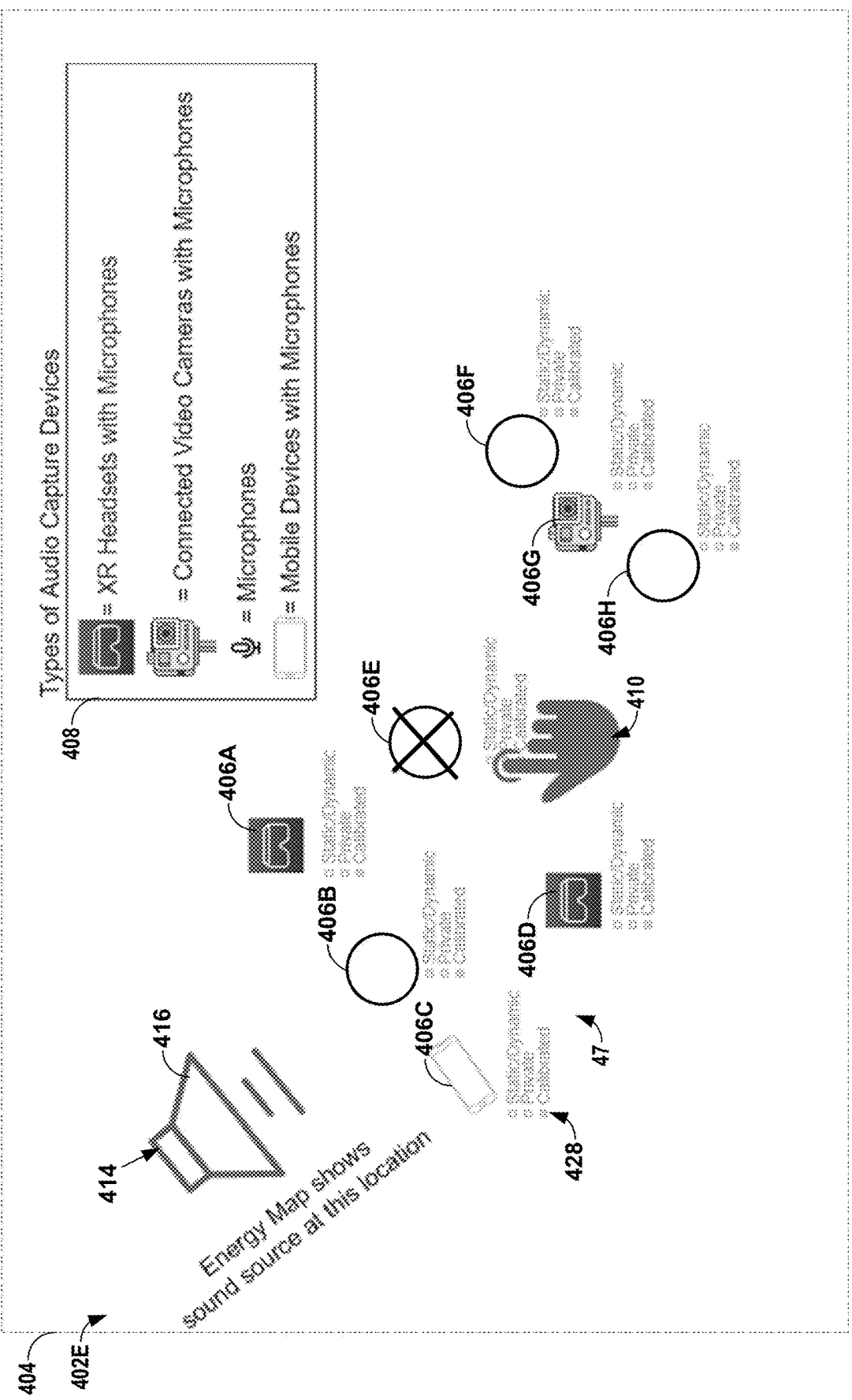

In some implementations, the user interface 36 is configured to allow a user to control or modify a presentation of information, such as metadata, associated with the audio elements. For example, FIG. 4E illustrates a GUI 402E that includes display of metadata 428 associated with one or more (e.g., each) of audio element representations 406. The metadata 428 may include for example, indications of whether the associated audio element is public or private, whether the associated audio element includes a calibrated or uncalibrated microphone, whether the associated audio element is static or dynamic, or the like. user interface 36 may enable the listener 410 to toggle the display of the metadata 428, for example, by presenting a UI element configured to control the display of the metadata 428. The UI element may be a graphical UI element, such as an icon, a radio button, a toggle switch, or a menu selection; or may be a include a dedicated or configurable physical input device, such as a toggle switch, button, or the like.

As mentioned above with respect to FIG. 4C, a user (e.g., listener 410) may be able to snap to a preferred listening position. Snapping or a snapping mode, in the context of 6DoF audio, may be defined as a transform of spatial coordinates for audio rendering. In some examples, this transform of spatial coordinates may be in real-time or substantially in real-time with latency of less than 2 seconds. In this manner, snapping may break the relationship between the listener's coordinates (e.g., a virtual location of a device or listener in a displayed world) used for rendering a visual scene (or audio scene in the case where there is no visual content) and the coordinates used for audio rendering. There may be two snapping modes hard snapping and soft snapping.

Figure 5A:
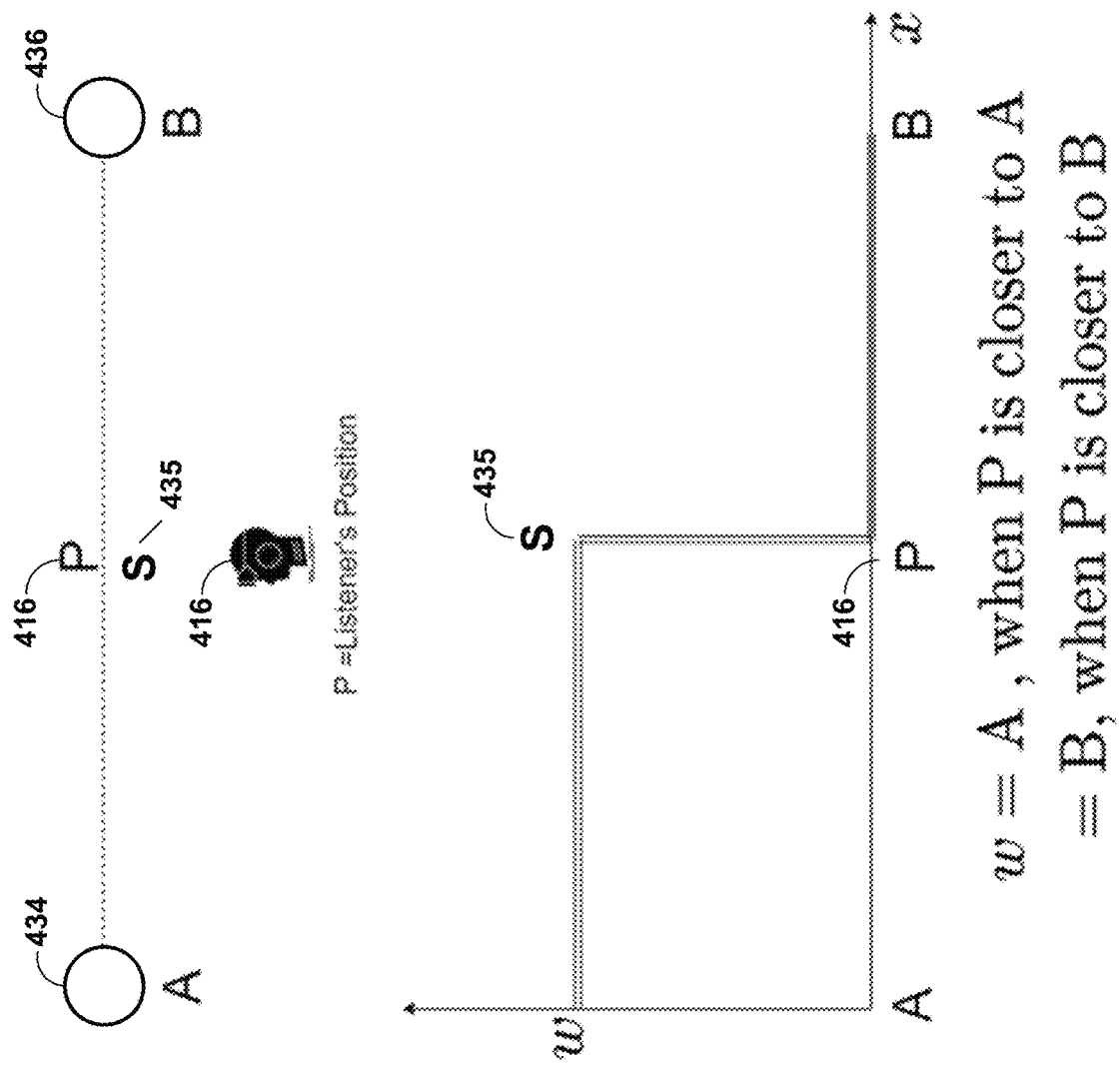
FIGS. 5A-5C are conceptual diagrams illustrating examples of snapping in accordance with techniques of this disclosure.

FIG. 5A is a conceptual diagram illustrating an example of hard snapping. One or more elements of FIG. 5A may be part of user interface 36. For example, position 416 of listener 410, snap position S 435, audio element 434, or audio element 436 or any combination thereof may be represented in user interface 36. In hard snapping, the threshold for weighting (w) the audio streams may be the distance of the position 416 of listener 410 (also referred to as the virtual location of the device or user) to the closest capture location A or B. Audio element 434 at location A and audio element 436 at location B may represent audio signals, such as from audio captures devices or synthesized audio streams, or pre-defined listening positions.

A first audio source distance threshold, such as snap position S 435, may be set anywhere between locations A and B. In some examples, listener 410 may set or move snap position S 435, for example, through a user interface such as the user interface disclosed herein. In some examples, snap position S 435 may be preset, provided in bitstream 27 by source device 12 or generated by content consumer device 14.

When audio elements 434 and 436 at locations A and B, respectively, are the same type of audio element, the midpoint of A and B may be set as a default location for position S 435. In the case where the midpoint is the default location for position P 435 (as shown in FIG. 5A), the audio source w is at location A (e.g., audio element 434) when position 416 of listener 410 is closer to location A (w=A) and the audio source w is at location B (e.g., audio element 436) when position 416 of listener 410 is closer to location B. In some examples, listener 410 may over-ride the choice of position S 435 to bias the snapping towards a audio element or sets of audio elements. For example, listener 410 may move position S 435 closer to location A. When listener 410 moves position S 435 closer to location A, listener 410 may hear the audio signal represented by audio element 436 when listener 410 is at the midpoint between locations A and B. When position 416 of listener 410 changes to be closer to location A than position S 435, the audio provided to listener 410 may snap to location A so that the audio signal presented to listener 410 is that represented by audio element 434. When position 416 of listener 410 were to move closer to location B than position S 435, the audio provided to listener 410 may snap to location B and the audio provided to listener 410 may be the audio signal represented by audio element 436.

For example, a device, such as VR headset 1100 may determine virtual location information representative of a virtual location of the device in the displayed world (e.g., position 416 of listener 410). VR headset 1100 may compare the virtual location information to a first audio source distance threshold (e.g., position S 435) and select, based on the comparison, at least one audio stream (e.g., audio element 434 or 436) which may be provided to the user (e.g., listener 410).

Visual or auditory feedback may be provided to alert listener 410 that they have snapped to a listening position (e.g., position A or position B). For example, VR headset 1100 may provide a visual alert, such as a fade to black, a flash of light and/or a visual marker at the new snapped to position (e.g., position A or position B). In the case where the snapped to location may be out of the field of view of listener 410 (e.g., behind the listener), the visual alert may be indicative of the snapped to location being out of the field of view, for example, fade to black, flash of light, or some other technique that may be associated with the snapped to location being out of listener's 410 field of view.

In some examples, listener 410 may hear a fade in/out during the snap or some other audio alert that is indicative of snapping occurring. For example, headphones 1104 may provide listener 410 with a fade in/out, a tone, a jingle, a snapping sound, a word (such as "snap") or some other indication that snapping has occurred.

Figure 5B:
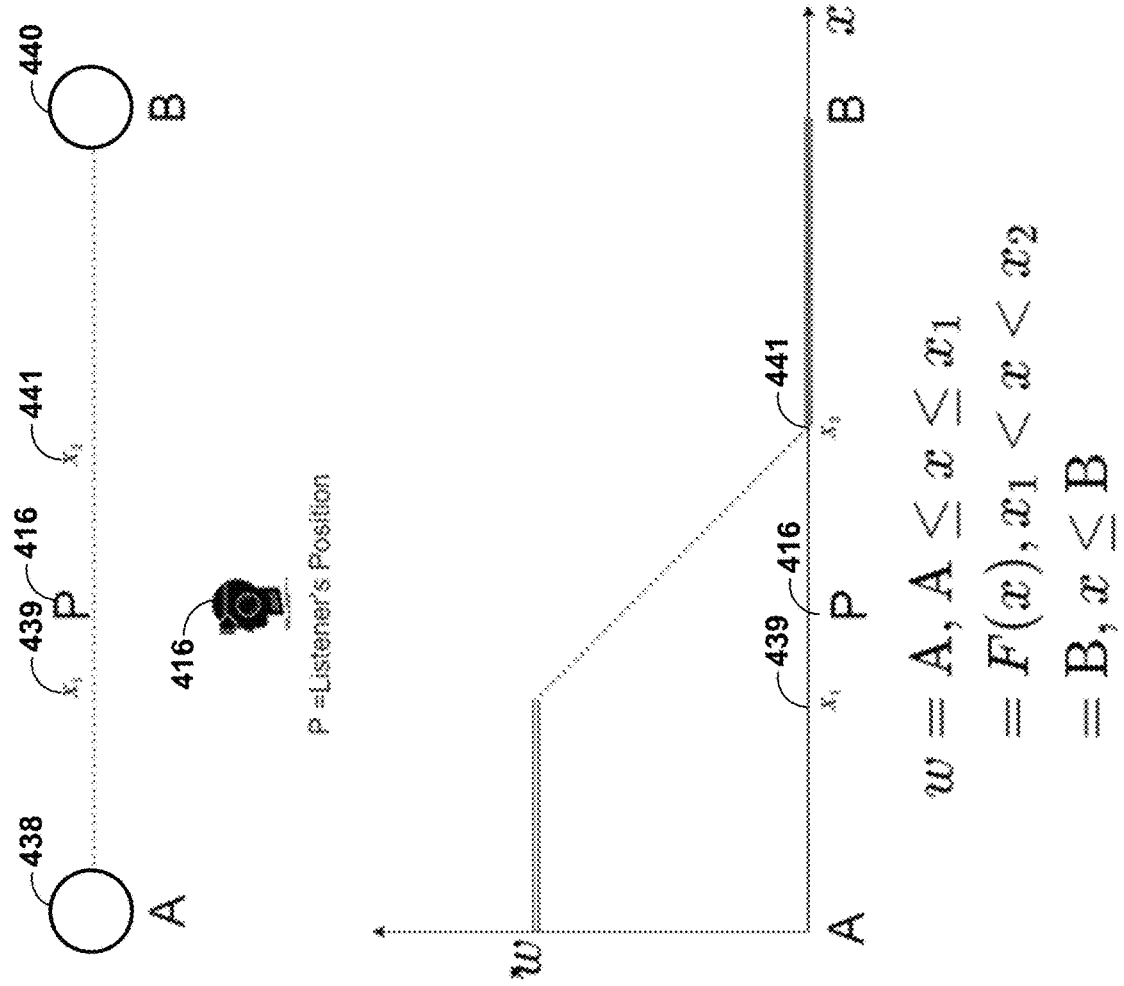

FIG. 5B is a conceptual diagram illustrating an example of soft snapping. One or more elements of FIG. 5B may be part of user interface 36. For example, position 416 of listener 410, snap position $X_1$ 429, snap position $X_2$ 442, audio element 438, or audio element 440 or any combination thereof may be represented in user interface 36. The second snapping mode is soft snapping. Soft snapping may occur when the snapping is softened by a function F(x) when position 416 of the listener is between a first audio source distance threshold (e.g., snap position $X_1$) and a second audio source distance threshold (e.g., snap position $X_2$) (the soft-snap area) as seen in FIG. 5B. While F(x) is shown in FIG. 5B as being a linear function, F(x) may be any function.

In this manner, preference can be given to audio rendering of audio element 438 at location A or audio element 440 at location B by a device such as headphones 1104. In some examples, the region may be an asymmetric region and include hysteresis behavior. For example, a device, such as VR headset 1100, may determine whether position 416 of listener 410 has remained steady relative to a first audio source distance threshold (e.g., snap position $X_1$ 439) and a second audio source distance threshold (e.g., snap position $X_2$ 441) for a predetermined period of time. Based on the device determining that position 416 of listener 410 has been steady for the predetermined period of time, the snap or the transition of the audio being presented to listener 410 may occur. For example, a device may determine that a virtual location of the user has moved from between snap position $X_1$ 439 and snap position $X_2$ 441 to between position $X_2$ 441 and location B. Once the predetermined time has passed, the audio presented to listener 410 may snap to audio element 440 at location B.

In other respects, soft snapping may function similarly to hard snapping. Listener 410 may snap to location A and hear audio represented by audio element 438 at location A when position 416 of listener 410 is between snap position $X_1$ 439 and location A (w=A when $A \leq x \leq X_1$) Listener 410 may hear audio represented by both audio element 438 and audio element 440 according to a function F(x) when position 416 of listener 410 is between snap position $X_1$ 439 and snap position $X_2$ 441 (w=F(x) when $X_1 < x < X_2$). For example, a device may adaptively mix audio represented by both audio element 438 and audio element 440 according to F(x) or interpolate a third audio stream based on the audio represented by audio element 438 and audio element 440 and F(x) when position 416 of listener 410 is between snap position $X_1$ 439 and snap position $X_1$ 441 (in the soft snapping region). Listener 410 may snap to location B and hear audio represented by audio element 440 at location B when position 416 of listener 410 is between location B and snap position $X_2$ 441 (w=B when $X_2 < X \leq B$). As with hard snapping, visual or auditory alerts may be presented to listener 410. In some examples, visual or auditory alerts may be presented when snapping occurs and when position 416 of listener 410 enters the area between snap position $X_1$ and snap position $X_2$. For example, the audio source w is at location A (e.g., audio element 438) when position 416 of listener 410 is between location A and location B. In some examples, crossfading may be presented and be dependent on both time and the listener's motion.

Figure 5C:
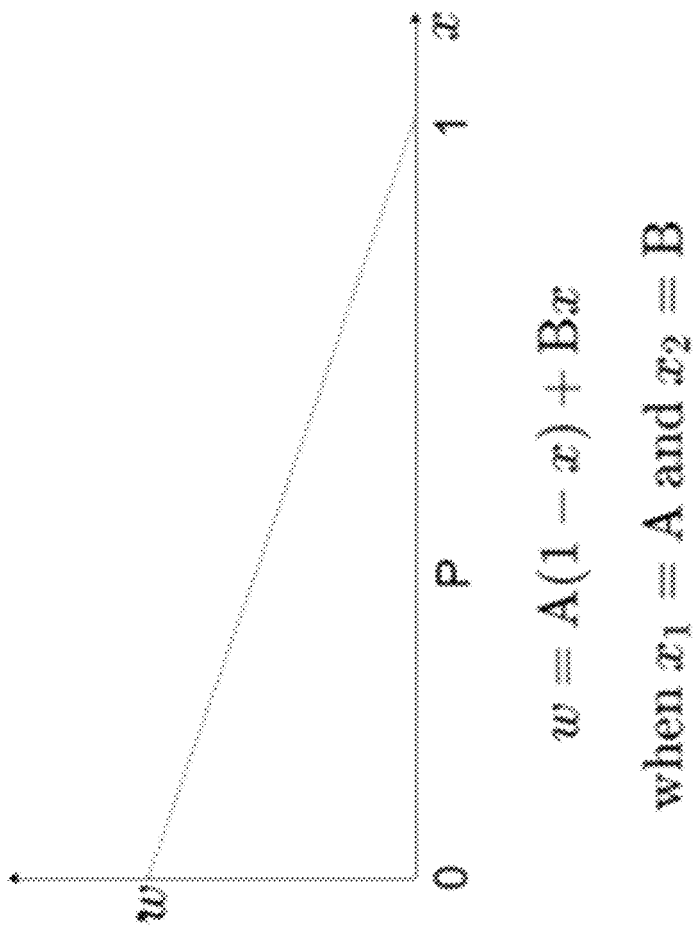

FIG. 5C is a conceptual diagram of another example of soft snapping. One or more elements of FIG. 5C may be part of user interface 36. For example, the formula or a graph representing the formula or a combination thereof may be represented in user interface 36. In the example of FIG. 5C, the threshold region between position $X_1$ and position $X_2$ is extended to the entire region between location A and location B. In this example, listener 410 may hear only audio from location A when position 416 of listener 410 is at location A, may hear a mix of audio from location A and location B when position 416 of listener 410 is between location A and location B, and hear audio only from location B when position 416 of listener 410 is at position B.

The above-mentioned examples (FIGS. 5A-5C) may be position dependent snapping. In other examples, snapping may not be position dependent. For example, listener 410 may snap to a location through a user interface (such as that of FIG. 4C), rather than through moving position 416 of listener 410.

Figure 5D:
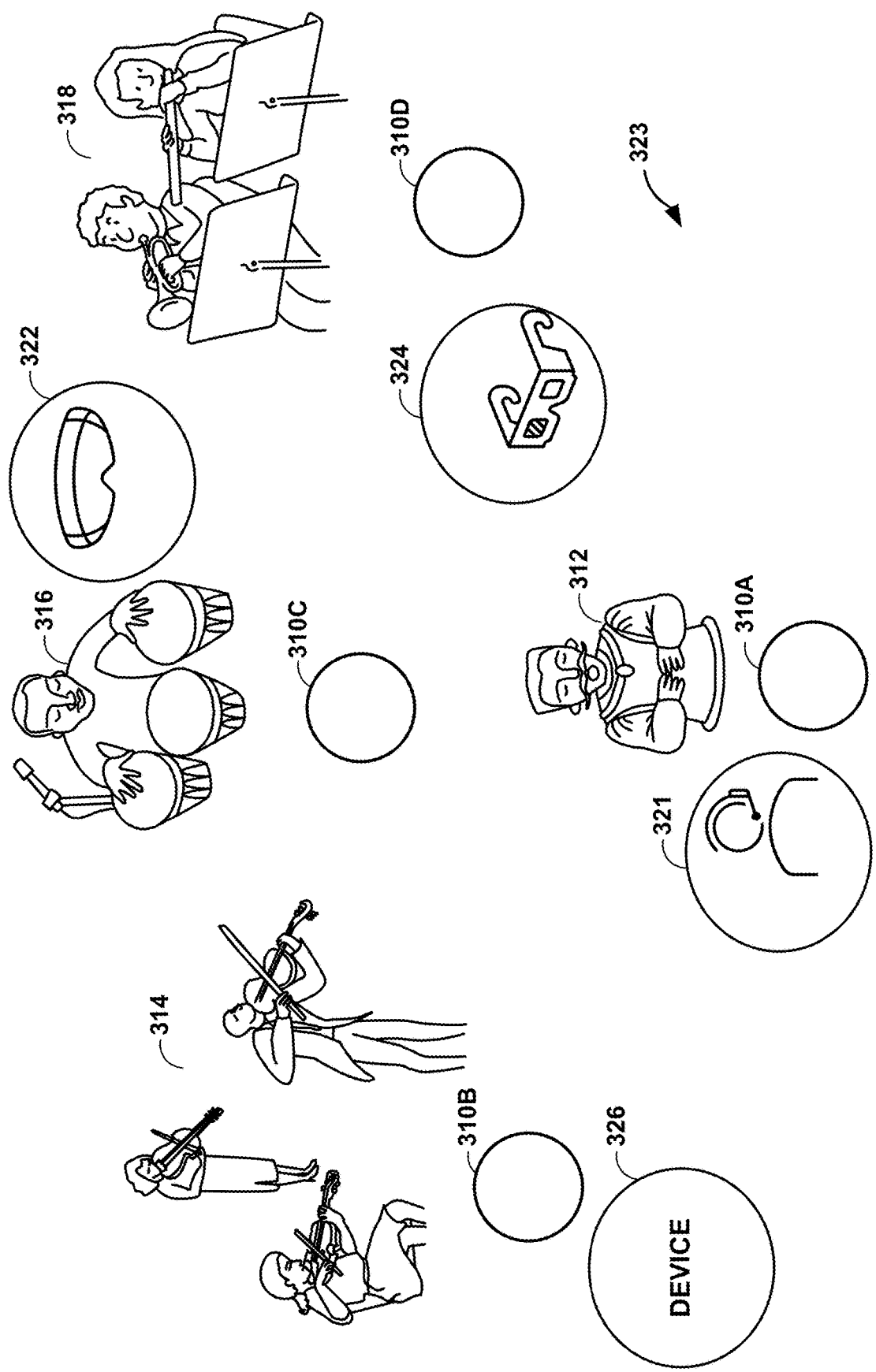
FIGS. 5D and 5E are conceptual diagrams illustrating an example of a concert according to the techniques of this disclosure.

FIG. 5D is a conceptual diagram illustrating an example concert with three or more audio elements. One or more elements of FIG. 5D may be part of user interface 36. For example, the audio element 310A, the audio element 310B, the audio element 310C, the audio element 310D, the singer 312, the string section 314, the drummer 316, the other musicians 318, the headphones 321, the smart glasses 324, the VR goggles 322 or any combination thereof may be represented in user interface 36. In the example of FIG. 5D, a number of musicians are depicted on stage 323. Singer 312 is positioned behind audio element 310A. A string section 314 is depicted behind audio element 310B. Drummer 316 is depicted behind audio element 310C. Other musicians 318 are depicted behind audio element 310D. Audio elements 310A-301D may capture audio streams that correspond to the sounds received by microphones. In some examples, audio elements 310A-310D may represent synthesized audio streams. For example, audio element 310A may represent a captured audio stream(s) primarily associated with singer 312, but the audio stream(s) may also include sounds produced by other band members, such as the string section 314, the drummer 316 or the other musicians 318, while the audio element 310B may represent a captured audio stream(s) primarily associated with string section 314, but include sounds produced by other band members. In this manner, each of audio elements 310A-310D, may represent a different audio stream(s).

Also, a number of devices are depicted. These devices represent user devices located at a number of different desired listening positions. Headphones 320 are positioned near audio element 310A, but between audio element 310A and audio element 310B. As such, according to the techniques of this disclosure, stream selection unit 44 may select at least one of the audio streams to produce an audio experience for the user of the headphones 320 similar to the user being located where the headphones 320 are located in FIG. 5D. Similarly, VR goggles 322 are shown located behind the audio element 310C and between the drummer 316 and the other musicians 318. The stream selection unit 44 may select at least one audio stream to produce an audio experience for the user of the VR goggles 322 similar to the user being located where the VR goggles 322 are located in FIG. 5D.

Smart glasses 324 are shown located fairly centrally between the audio elements 310A, 310C and 310D. The stream selection unit 44 may select at least one audio stream to produce an audio experience for the user of the smart glasses 324 similar to the user being located where the smart glasses 324 are located in FIG. 5D. Additionally, device 326 (which may represent any device capable of implementing the techniques of this disclosure, such as a mobile handset, a speaker array, headphones, VR goggles, smart glasses, etc.) is shown located in front of audio element 310B. Stream selection unit 44 may select at least one audio stream to produce an audio experience for the user of the device 326 similar to the user being located where the device 325 is located in FIG. 5D. While specific devices are discussed with respect to particular locations, any of the devices depicted may provide an indication of a desired listening position that is different than depicted in FIG. 5D.

Figure 5E:
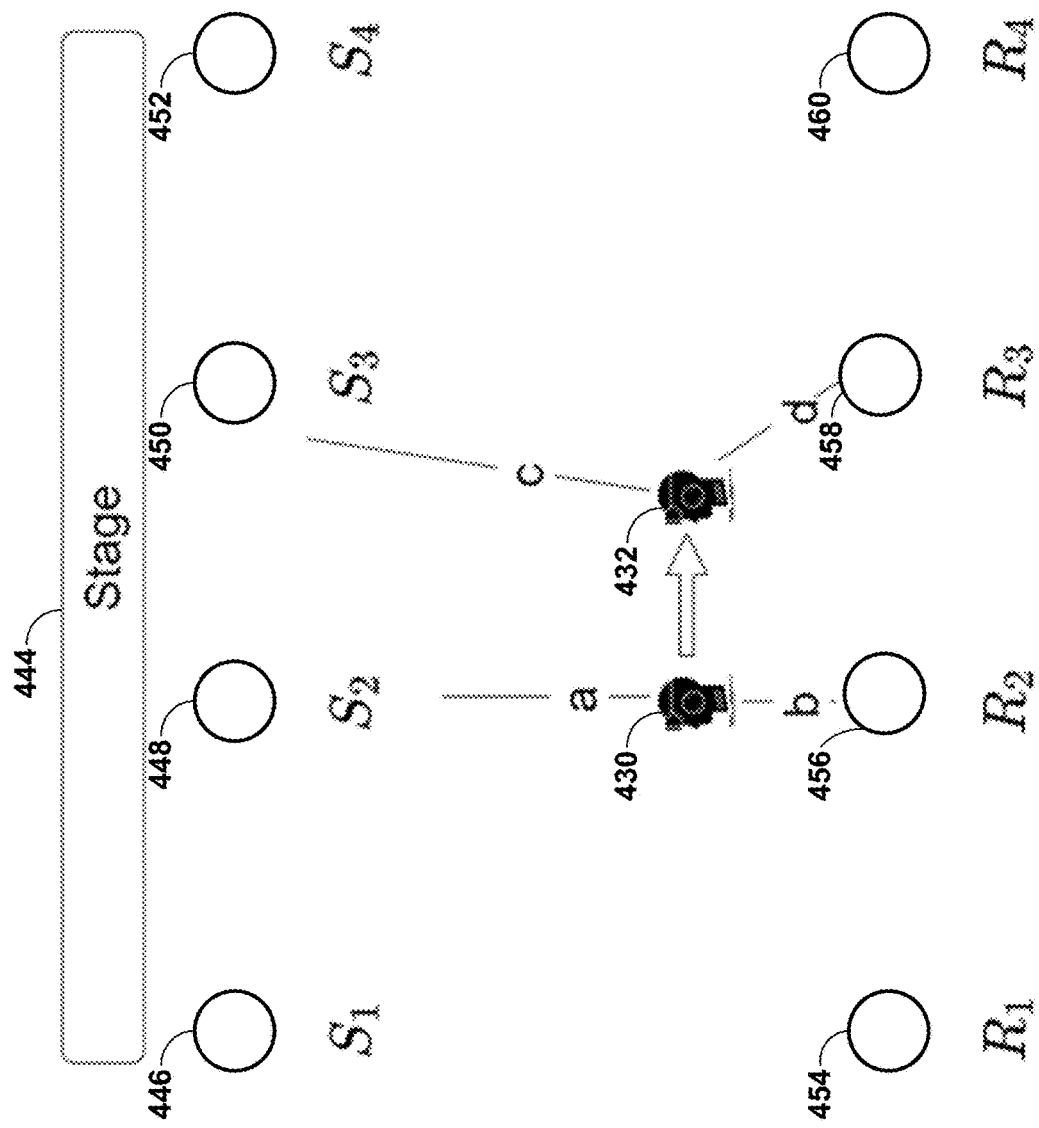

FIG. 5E is a conceptual diagram illustrating an example concert with three or more audio elements. One or more elements of FIG. 5E may be part of user interface 36. For example, audio element S1 446, audio element S2 448, audio element S3 450, audio element S4 452, audio element R1 454, audio element R2 456, audio element R3 458, audio element R4 460, stage 444, position of listener 430 or position of listener 432 or any combination thereof may be represented in user interface 36. FIG. 5E depicts a concert layout. In this example, a listener may want to snap to audio elements which are farther away from a position of the listener as they move between multiple audio elements (S1 446, S2 448, S3 450, S4 452) near the stage and audio elements (R1 454, R2 456, R3 458, R4 460) away from the stage.

For example, when the listener wants to hear the performers close up (e.g., near stage 444), but wants to see more of the stage (e.g., a wider view than a location closer to the stage) such that position 430 of the listener which is further away from the stage, then listener may bias the audio source distance threshold of the snapping towards stage audio element S2 448 instead of closest audio element R2 456 (distance a>distance b). In some examples, with this bias towards the stage audio elements, the listener stays snapped to S2 448 as the listener moves towards position 432. At position 432, the listener may snap to audio element S3 450 because the listener's distance (c) to audio element S3 450 is less than the listener's distance to audio element S2 448. Without the bias, the listener would have snapped to audio elements R2 456 and R3 458 as they moved from position 430 to position 432.

Figure 5F:
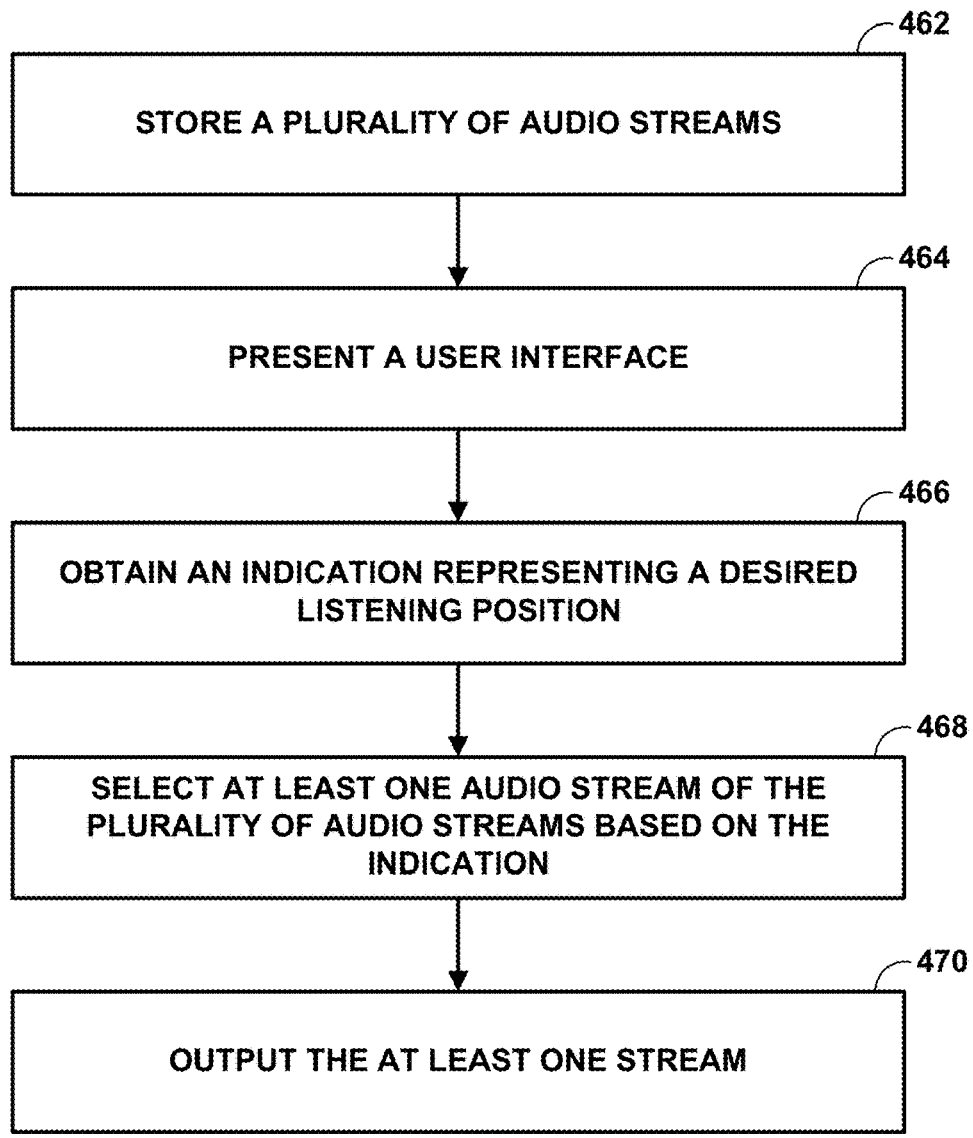
FIGS. 5F and 5G are flowcharts illustrating example user interface techniques according to this disclosure.

FIG. 5F is a flowchart illustrating example user interface techniques according to this disclosure. The content consumer device 14 may store a plurality of audio streams (462). For example, the content consumer device 14 may receive bitstream 27 from source device 12 and bitstream 27 may include representations of plurality of audio streams, may recreate the one or more audio streams from the representations and store the plurality of audio streams. One or more processors of content consumer device 14 may present a user interface 36 (464). In some examples, the user interface 36 may be a graphical user interface. In some examples, the user interface 36 may be a gesture-based user interface, such as a user interface configured to recognize gestures of a user. In some examples, the user interface 36 may be a voice command-based user interface, such as a user interface that recognizes voice commands. In some examples, the user interface 36 may be a touch-based user interface, such as a user interface that recognizes touches, such as a single touch or multiple touches (e.g., a multi-touch user interface). In other examples, the user interface 36 may be another type of user interface.

One or more processors of content consumer device 14 may obtain an indication via the user interface 36 representing a desired listening position (466). For example, a user may indicate to via user interface 36 a desired listening position, such as desired listening position 413. One or more processors of content consumer device 14 may select at least one audio stream of the plurality of audio streams based on the indication (468). For example, stream selection unit 44 may select at least one audio stream such that the user may experience audio as if the user was located at the desired listening position. In some example, content consumer device 14 may output the at least one audio stream (470), for example, to one or more speaker feeds.

Figure 5G:
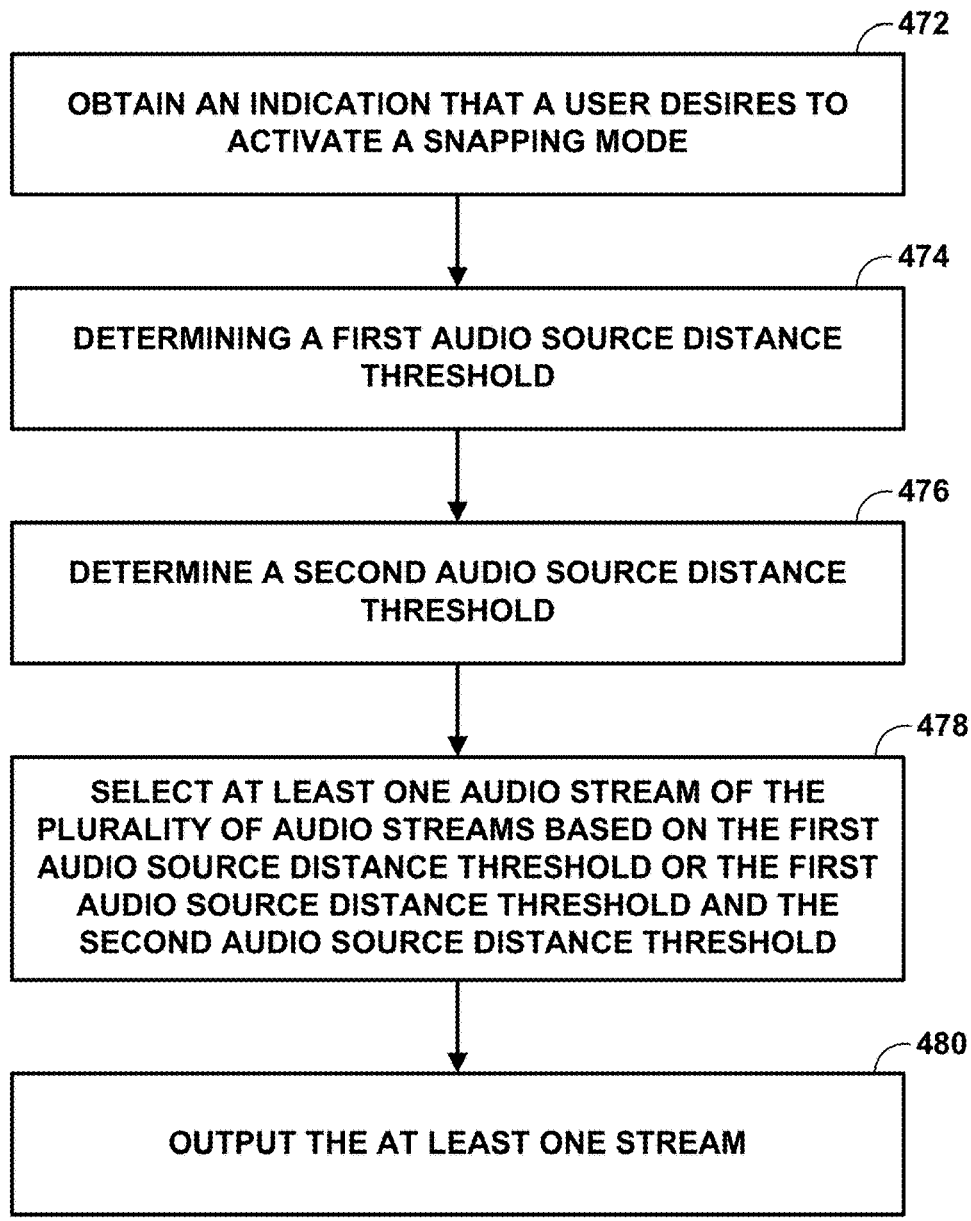

FIG. 5G is a flowchart illustrating a further example of user interface techniques according to this disclosure. In some examples, the techniques of FIG. 5G may be used with the techniques of FIG. 5F. The techniques of FIG. 5G may represent a snapping mode. One or more processors of the content consumer device 14 may obtain an indication that a user desires to activate a snapping mode (472). The snapping mode may operate as described with respect to FIGS. 5A-5E. For example, user 1102 may provide an indication to user interface 36 that she desires to activate a snapping mode. One or more processors of content consumer device 14 may determine a first audio source distance threshold (474). In some examples, the first audio source distance threshold may be based on an indication from a user. In other examples, the first audio source distance threshold may preset or conveyed in the bitstream 27 from the source device 12. In other examples, the first audio source distance threshold may be generated by the content consumer device 14. For example, one or more processors of the content consumer device 14 may determine the first audio source distance threshold to be snapping point S 435 in the example of hard snapping. In other examples, one of more processors of the content consumer device 14 may determine the first audio source distance threshold to be snap position $X_1$ in the example of soft snapping. In the example of soft snapping, the one or more processors may also determine a second audio source distance threshold (476). For example, one or more processors of content consumer device 14 may determine the second audio source distance threshold to be snap position $X_2$.

One or more processors of content consumer device 14 may select at least one audio stream further based on the first audio source distance threshold (e.g., in the case of hard snapping) or further based on the first audio source distance threshold and the second audio source distance threshold (e.g., in the case of soft snapping) (478). For example, in the case of hard snapping, the one or more processors of content consumer device 14 may compare a location of a listener's position (e.g., position 416) with the first audio source distance threshold (e.g., snapping point S 435) and if the listener's position is closer to a given audio stream, e.g., audio element 434, stream selection unit 44 may select the given audio stream. For example, in the case of soft snapping, the one or more processors of content consumer device 14 may compare a location of a listener's position (e.g., position 416) with the first audio source distance threshold (e.g., snap position $X_1$ 439) to a first audio stream (e.g., audio element 438) and with the second audio stream distance threshold (e.g., snap position $X_2$) and based on the comparison, stream selection unit 44 may select the first audio stream, the second audio stream or both. In some examples, the content consumer device 14 may output the at least one audio stream (480), for example, to one or more speaker feeds.

Figure 6:
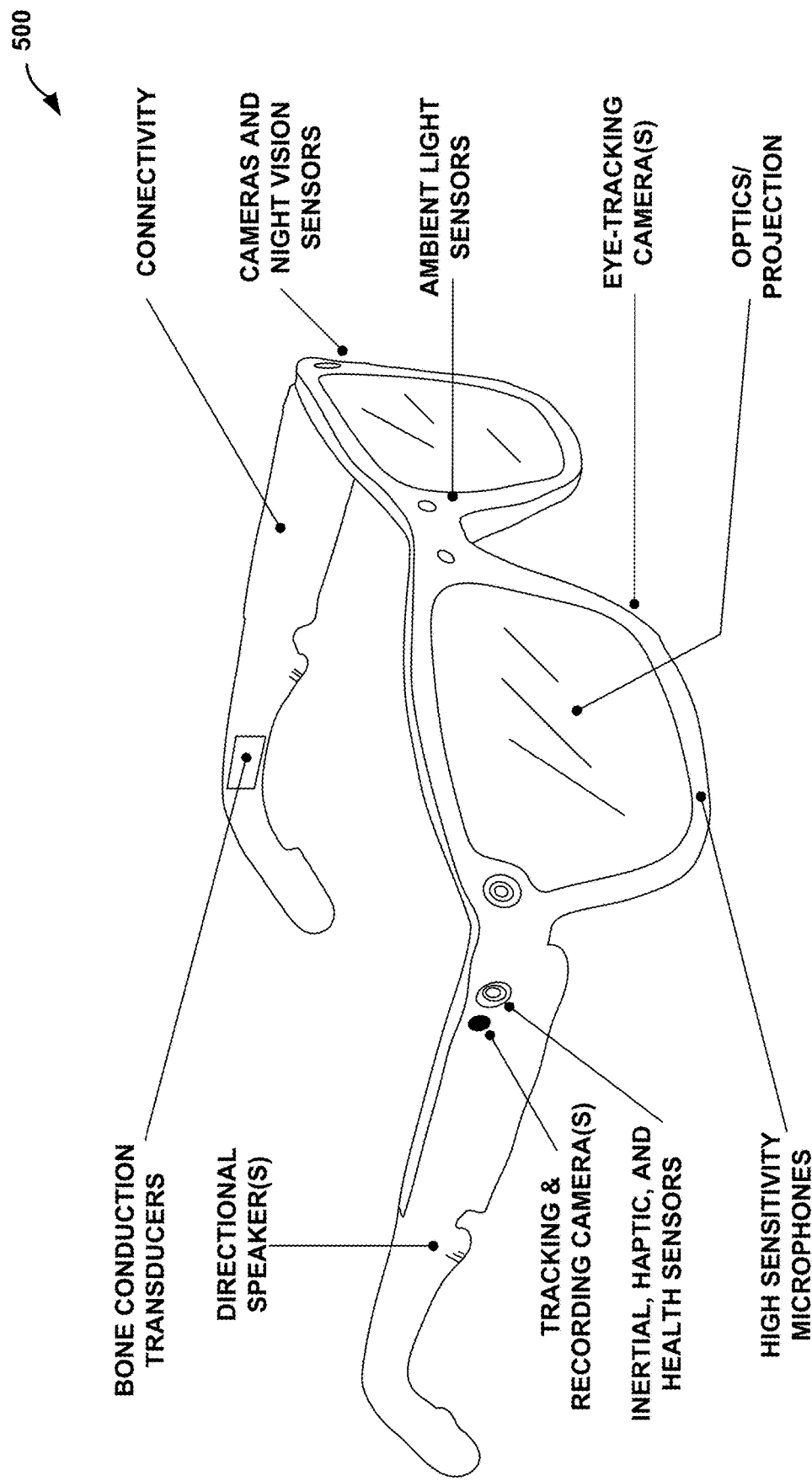
FIG. 6 is a diagram illustrating an example of a wearable device that may operate in accordance with various aspect of the techniques described in this disclosure.

FIG. 6 is a diagram illustrating an example of a wearable device 500 that may operate in accordance with various aspect of the techniques described in this disclosure. In various examples, the wearable device 500 may represent a VR headset (such as the VR headset 1100 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents a VR device, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, etc. The wearable device 500 also includes one or more ambient light sensors, one or more cameras and night vision sensors, and one or more bone conduction transducers. In some instances, the wearable device 500 may also include one or more passive and/or active cameras with fisheye lenses and/or telephoto lenses. Although not shown in FIG. 6, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 6, wearable device 500 may include other types of sensors for detecting translational distance.

Although described with respect to particular examples of wearable devices, such as the VR headset 1100 discussed above with respect to the examples of FIG. 2 and other devices set forth in the examples of FIGS. 1A-1C, a person of ordinary skill in the art would appreciate that descriptions related to FIGS. 1A-1C, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 7B:
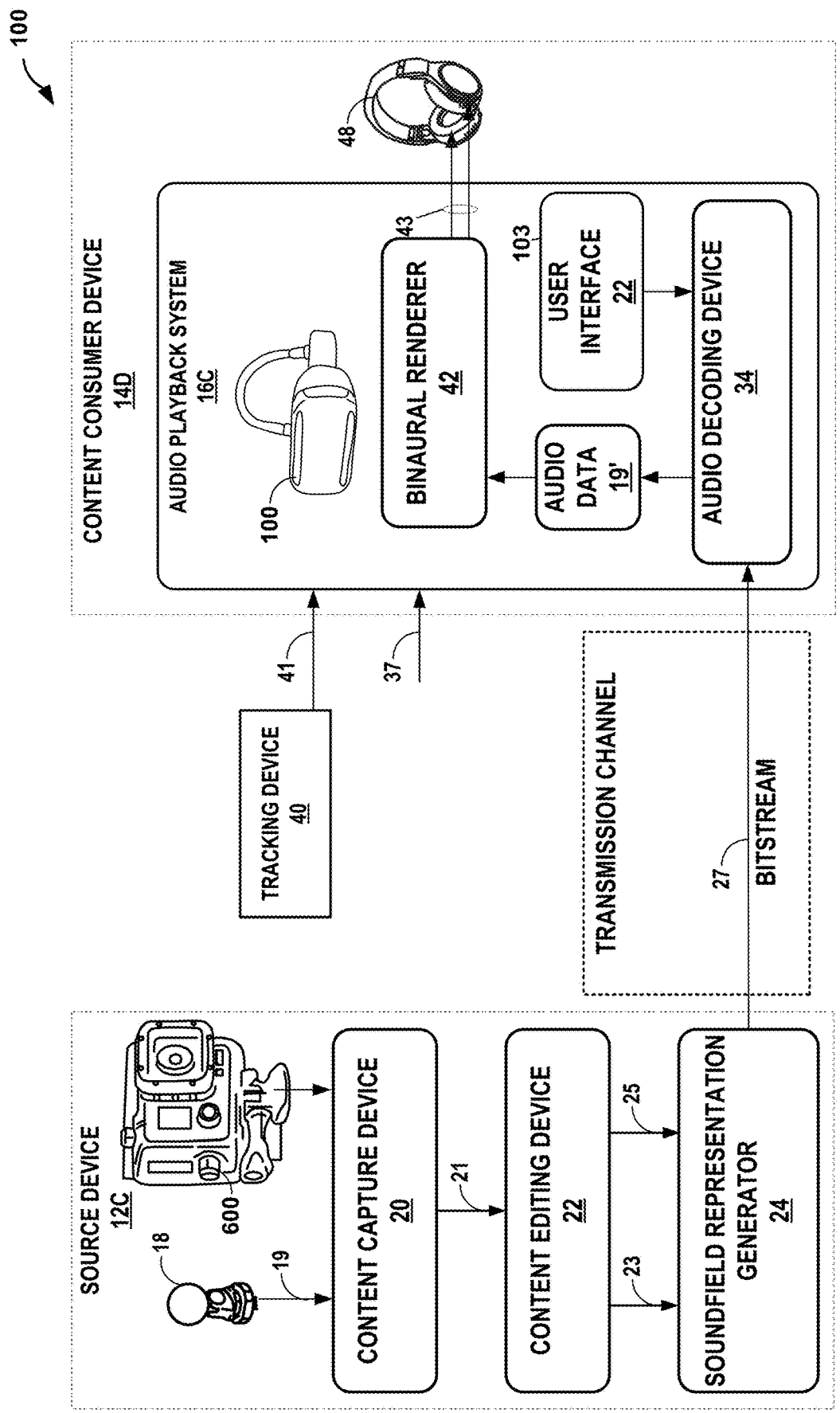

FIGS. 7A and 7B are diagrams illustrating example systems that may perform various aspects of the techniques described in this disclosure. FIG. 7A illustrates an example in which the source device 12C further includes a camera 600. The camera 600 may be configured to capture video data, and provide the captured raw video data to the content capture device 20. The content capture device 20 may provide the video data to another component of the source device 12C, for further processing into viewport-divided portions.

In the example of FIG. 7A, the content consumer device 14C also includes the VR headset 1100. It will be understood that, in various implementations, the VR headset 1100 may be included in, or externally coupled to, the content consumer device 14C. The VR headset 1100 includes display hardware and speaker hardware for outputting video data (e.g., as associated with various viewports) and for rendering audio data.

FIG. 7B illustrates an example in which the audio renderers 32 shown in FIG. 7A are replaced with a binaural renderer 42 capable of performing binaural rendering using one or more HRTFs or the other functions capable of rendering to left and right speaker feeds 43. The audio playback system 16C of content consumer device 14D may output the left and right speaker feeds 43 to headphones 48.

The headphones 48 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43. It should be noted that the content consumer device 14C and the content consumer device 14D may be used with the source device 12B of FIG. 1C.

Figure 8:
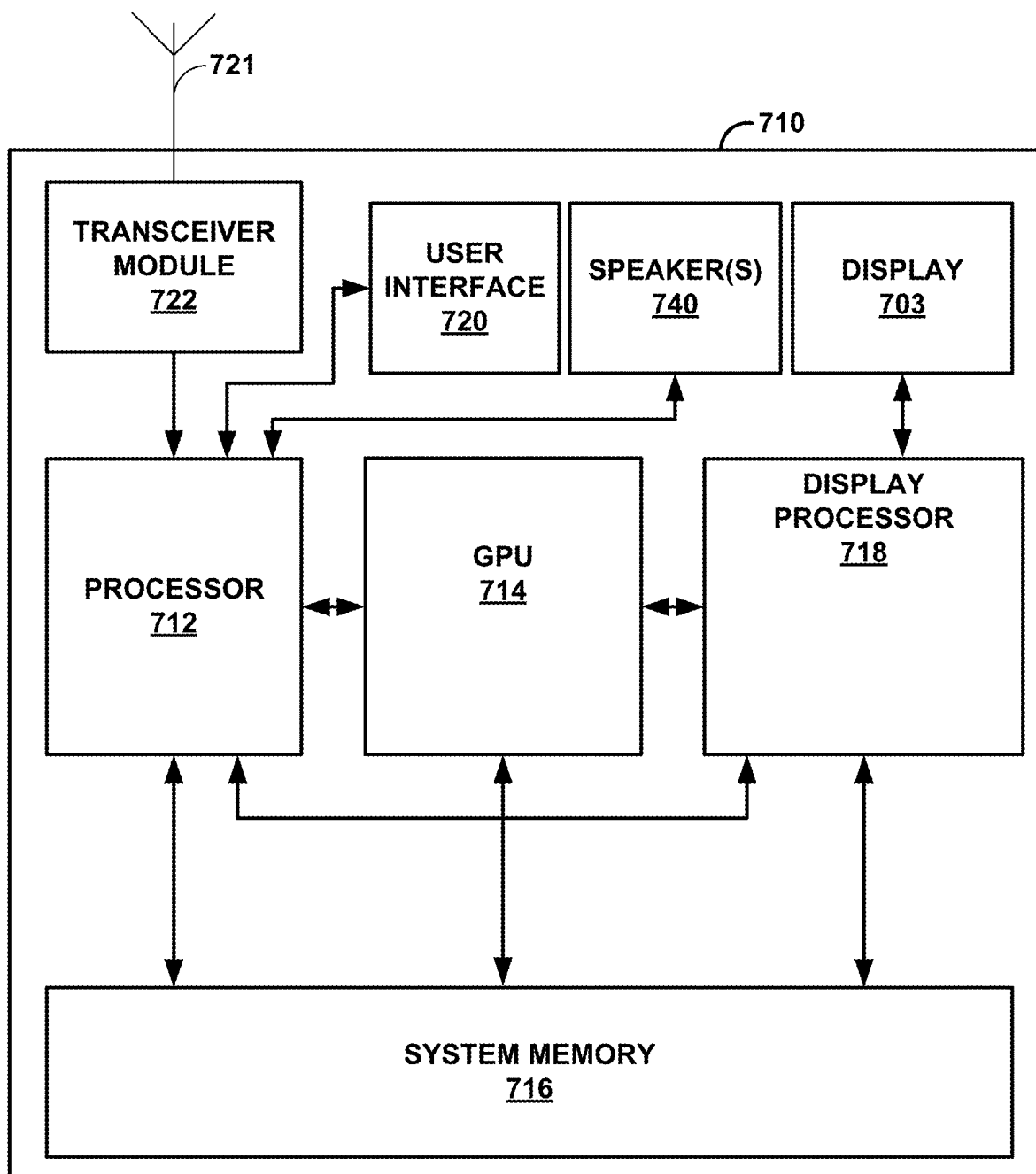
FIG. 8 is a block diagram illustrating example components of one or more of the source device and the content consumer device shown in the example of FIGS. 1A-1C.

FIG. 8 is a block diagram illustrating example components of one or more of the source device and the content consumer device shown in the example of FIGS. 1A-1C. In the example of FIG. 8, the device 710 includes a processor 712 (which may be referred to as "one or more processors"

or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (e.g., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710.

In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (e.g., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL'; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may include one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. For example, the processor 712 may implement the functionality described above in FIGS. 4A-4E with respect to user interface 36. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 9A:
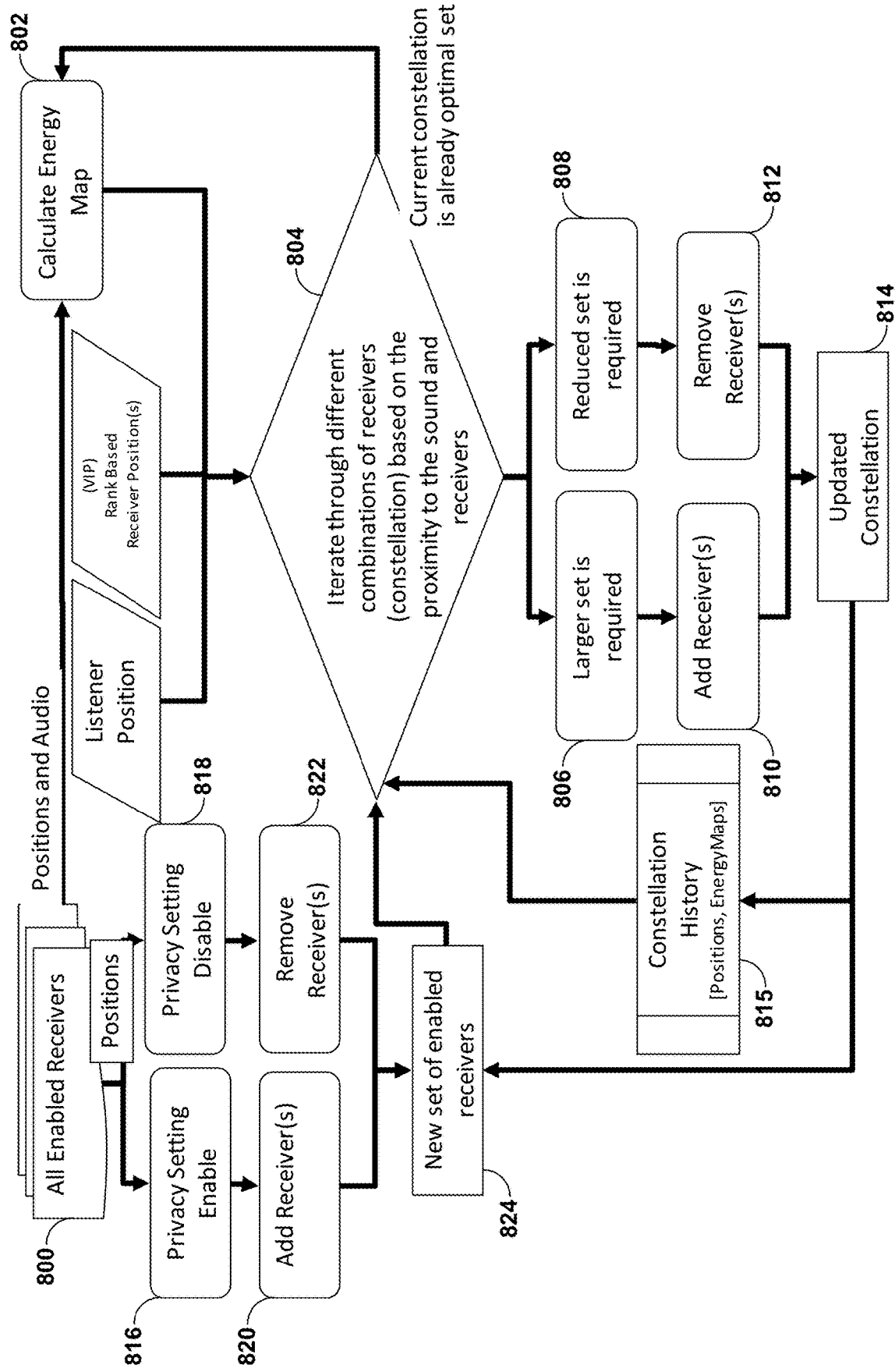
FIGS. 9A-9C are flowcharts illustrating example operation of the stream selection unit shown in the examples of FIGS. 1A-1C in performing various aspects of the stream selection techniques.
Figure 9B:
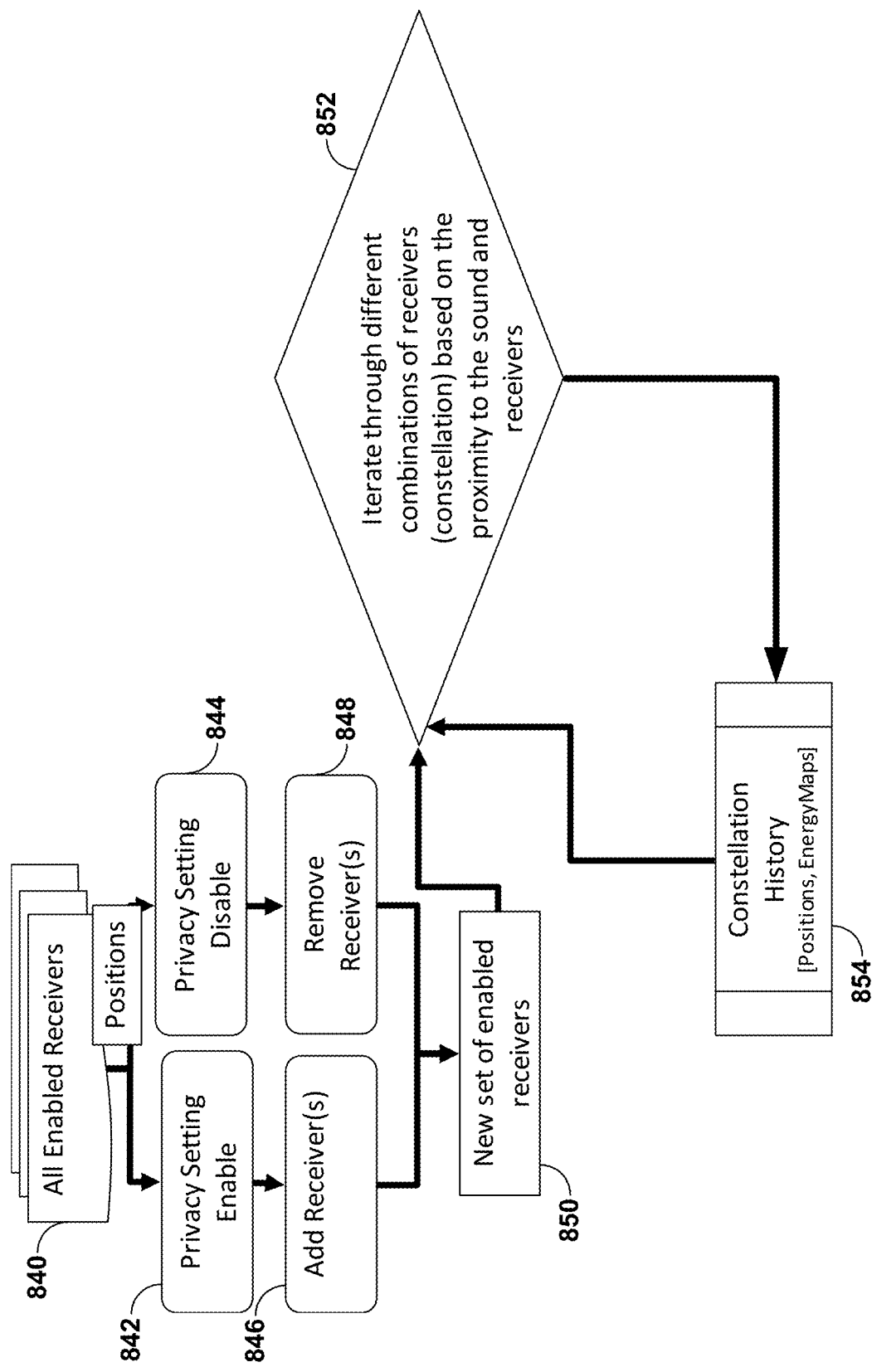
Figure 9C:
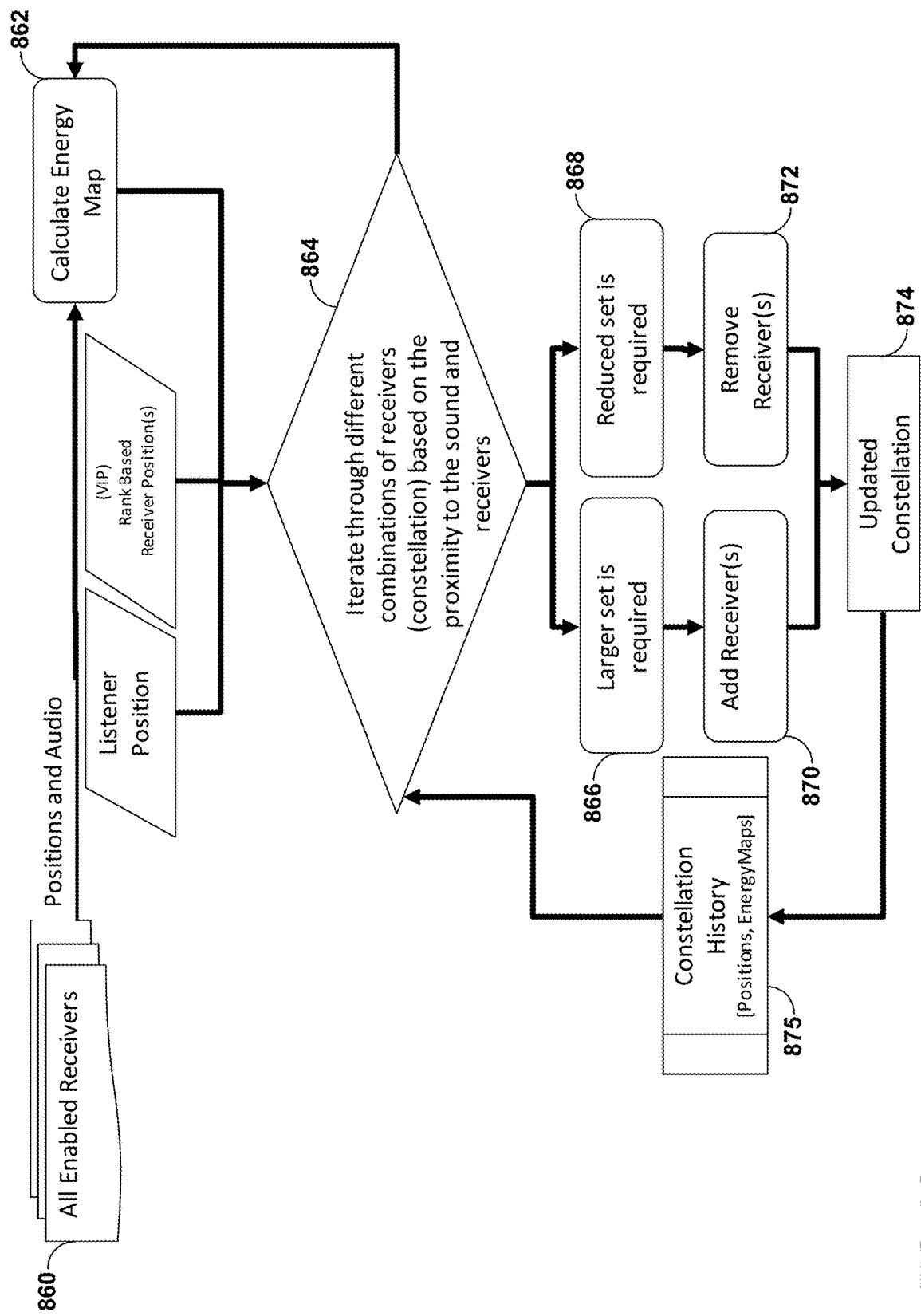

FIGS. 9A-9C are flowcharts illustrating example operations of the stream selection unit 44 shown in the examples of FIGS. 1A-1C in performing various aspects of the stream selection techniques. Referring first to the example of FIG.

9A, the stream selection unit 44 may obtain audio stream 27 from all enabled audio elements, where the audio streams 27 may include corresponding audio metadata, such as the ALI 45A (800). The stream selection unit 44 may perform the energy analysis with respect to each of the audio streams 27 to calculate a respective energy map (802).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (804). As shown in FIG. 9A, the audio elements may be ranked or otherwise associated with different access rights. The stream selection unit 44 may iterate, based on the listener position (which is another way to refer to the "virtual location" or "device location") represented by the DLI 45B, and the audio element positions represented by the ALI 45A, in the manner described above to identify whether a larger subset of the audio streams 27 or a reduced subset of the audio streams 27 is required (806, 808).

When a larger subset of the audio streams 27 is required, the stream selection unit 44 may add audio element(s), or in other words, additional audio stream(s) to the audio data 19' (such as when the user is closer to the audio source in the example of FIG. 3A) (810). When a reduced subset of the audio streams 27 is required, the stream selection unit 44 may remove audio elements or in other words existing audio stream(s) from the audio data 19' (such as when the user is farther from the audio source in the example of FIG. 3A) (812).

In some examples, the stream selection unit 44 may determine that the current constellation of audio elements is an optimal set (or, in other words, that the existing audio data 19' is to remain the same as the selection process described herein results in the same audio data 19') (804), and the process may return to 802. However, when audio streams are added or removed from the audio data 19', the stream selection unit 44 may update the CM 47 (814), generating a constellation history (815 (including positions, energy maps, etc.).

In addition, the stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (816, 818). When privacy settings enable addition of an audio element, the stream selection unit 44 may add audio element(s) to the updated CM 47 (which refers to addition of audio stream(s) to the audio data 19') (820). When privacy settings disable addition of an audio element, the stream selection unit 44 may remove audio element(s) from the updated CM 47 (which refers to removal of audio stream(s) from the audio data 19') (822). In this manner, the stream selection unit 44 may identify a new set of enabled audio elements (824).

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element). The stream selection unit 44 may further update the energy maps at an audio frame rate (meaning that the energy maps are updated each frame).

Referring next to the example of FIG. 9B, the stream selection unit 44 may operate in the manner described above with respect to FIG. 9A, except that the stream selection unit 44 may not base the determination of the CM 47 on energy maps. As such, the stream selection unit 44 may obtain audio stream 27 from all enabled audio elements, where the audio streams 27 may include corresponding audio metadata, such as the ALI 45A (840). The stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (842, 844).

When privacy settings enable addition of an audio element, the stream selection unit 44 may add audio element(s) to the updated CM 47 (which refers to addition of audio streams to the audio data 19') (846). When privacy settings disable addition of an audio element, the stream selection unit 44 may remove audio element(s) from the updated CM 47 (which refers to removal of audio stream(s) from the audio data 19') (848). In this manner, the stream selection unit 44 may identify a new set of enabled audio elements (850). The stream selection unit 44 may iterate (852) through the different combinations of audio elements in the CM 47 to determine the constellation history (854), which is representative of the audio data 19'.

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element).

Referring next to the example of FIG. 9C, the stream selection unit 44 may operate in the manner described above with respect to FIG. 9A, except that the stream selection unit 44 may not base the determination of the CM 47 on privacy settings enabled audio elements. As such, the stream selection unit 44 may obtain audio stream 27 from all enabled audio elements, where the audio streams 27 may include corresponding audio metadata, such as the ALI 45A (860). The stream selection unit 44 may perform the energy analysis with respect to each of the audio streams 27 to calculate a respective energy map (862).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (864). As shown in FIG. 9C, the audio elements may be ranked or otherwise associated with different access rights. The stream selection unit 44 may iterate, based on the listener position (which again is another way to refer to the "virtual location" or "device location" discussed above) represented by the DLI 45B, and the audio element positions represented by the ALI 45A, in the manner described above to identify whether a larger subset of the audio streams 27 or a reduced subset of the audio streams 27 is required (866, 868).

When a larger subset of the audio streams 27 is required, the stream selection unit 44 may add audio element(s), or in other words, additional audio stream(s) to the audio data 19' (such as when the user is closer to the audio source in the example of FIG. 3A) (870). When a reduced subset of the audio streams 27 is required, the stream selection unit 44 may remove audio element(s) or in other words existing audio stream(s) from the audio data 19' (such as when the user is farther from the audio source in the example of FIG. 3A) (872).

In some examples, the stream selection unit 44 may determine that the current constellation of audio elements is an optimal set (or, in other words, that the existing audio data 19' is to remain the same as the selection process described herein results in the same audio data 19') (864), and the process may return to 862. However, when audio streams are added or removed from the audio data 19', the stream selection unit 44 may update the CM 47 (874), generating a constellation history (875).

The stream selection unit 44 may iterate in this fashion and update various inputs according to any given frequency. For example, the stream selection unit 44 may update positions at sensor rate (meaning that as positions are changed through movement of the audio element). The stream selection unit 44 may further update the energy maps at an audio frame rate (meaning that the energy maps are updated each frame).

Figure 10:
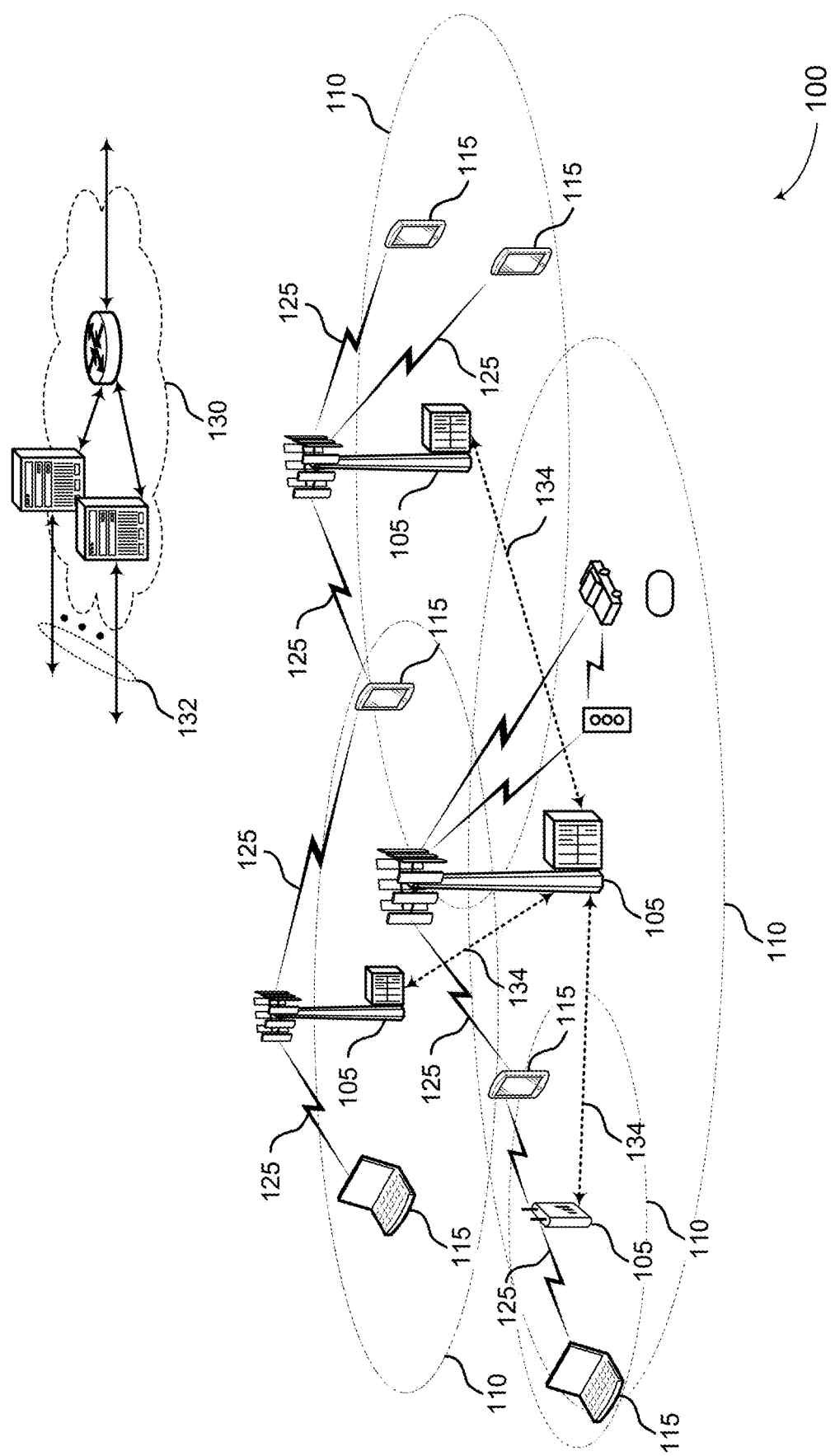
FIG. 10 illustrates an example of a wireless communications system in accordance with aspects of the present disclosure.

FIG. 10 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, a synthesized audio stream may be an audio stream that was stored in memory or was previously created or synthesized. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio metadata indicating privacy restrictions and/or password-based privacy data to toggle, mask, and/or null various audio streams and/or audio sources.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an $X_2$, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The present disclosure includes the following examples.

Example 1. A device configured to play one or more of a plurality of audio streams, the device comprising: a memory configured to store the plurality of audio streams and corresponding audio metadata, each of the audio streams representative of a soundfield, and the audio metadata includes capture location information representative of a capture location in a displayed world at which the corresponding one of the plurality of audio streams was captured by a corresponding capture device; and one or more processors coupled to the memory, and configured to: output, for display, a graphical user interface comprising capture device representations associated with coordinates of the displayed world; obtain an indication representing a user input selecting one or more of the capture device representations; and select, based on the indication, at least one audio stream of the plurality of audio streams.

Example 2. The device of example 1, wherein the one or more processors is further configured to reproduce, based on the at least one audio stream, the corresponding at least one soundfield.

Example 3. The device of example 1, wherein the one or more processors is further configured to output, to a reproduction device, the at least one audio stream or an indication of the at least one audio stream.

Example 4. The device of any combination of examples 1 to 3, wherein the one or more processors is further configured to combine at least two audio streams based on the indication representing the user input selecting the one or more of the capture device representations.

Example 5. The device of example 4, wherein the one or more processors is configured to combine the at least two audio streams by at least one of mixing the at least two audio streams or interpolating a third audio stream based on the at least two audio streams.

Example 6. The device of any combination of examples 1 to 5, wherein the capture device representations comprise at least one of icons, images, or alphanumeric representations corresponding to the capture device.

Example 7. The device of any combination of examples 1 to 6, wherein the capture device representations correspond to respective devices used to capture corresponding audio streams.

Example 8. The device of example 7, wherein the capture device representations are arranged in the graphical user interface with a spatial relationship representing relative positions of the respective devices used to capture the corresponding audio streams.

Example 9. The device of any combination of examples 1 to 8, wherein the indication representing the user input represents a user input selecting a plurality of the capture device representations.

Example 10. The device of any combination of examples 8 to 9, wherein the indication representing the user input represents a user input defining a zone around a plurality of capture device representations, wherein the zone is associated with coordinates of the displayed world.

Example 11. The device of any combination of examples 7 to 10, wherein the one or more processors are further configured to obtain an user input indication representing an importance assigned to a respective device or zone associated with coordinates of the displayed world, and wherein the importance indicates a relative gain applied to the audio streams associated with the respective device or zone.

Example 12. The device of any combination of examples 1 to 11, wherein the one or more processors are further configured to obtain an indication representing a desired listening position, and wherein the one or more processors reproduce the corresponding at least one soundfield based on the listening position.

Example 13. The device of example 12, wherein the one or more processors is further configured to, in response to obtaining the indication representing the desired listening position, output, for display, a graphical user interface element suggesting an alternative listening position.

Example 14. The device of any combination of examples 1 to 13, wherein the one or more processors is further configured to: obtain an indication indicating a relative perspective of a listening experience; determine virtual location information representative of a virtual location of the device in the displayed world; and select, based on the virtual location information, the capture location information, and the indication indicating the relative perspective of the listening experience, the at least one audio stream.

Example 15. The device of any combination of examples 1 to 14, wherein the one or more processors is further configured to obtain an indication indicating a toggle of display of metadata associated with the capture locations.

Example 16. The device of example 15, wherein, when the metadata is output for display, the capture device representations comprise augmented labels of the metadata, and wherein the indication representing the user input selecting one or more of the capture device representations comprising an indication representing a single touch impression on a display device communicatively coupled to the one or more processors, a multi-touch impression on the display device, a gesture on the display device, or a voice command.

Example 17. The device of any combination of examples 1 to 16, wherein the one or more processors is further configured to obtain an indication indicating a toggle of display of an energy map with the capture locations.

Example 18. The device of any combination of examples 1 to 17, wherein the device comprises an extended reality headset, and wherein the displayed world comprises a visual scene represented by video data captured by a camera.

Example 19. The device of any combination of example 1 to 17, wherein the device comprises an extended reality headset, and wherein the displayed world comprises a virtual world.

Example 20. The device of any combination of examples 1 to 19, further comprising a head-mounted display configured to present the displayed world and the graphical user interface.

Example 21. The device of any combination of examples 1 to 19, wherein the device comprises a mobile handset.

Example 22. The device of any combination of examples 1 to 21, further comprising a receiver configured to receive the plurality of audio streams.

Example 23. The device of example 22, wherein the receiver includes a receiver configured to receive the plurality of audio streams in accordance with a fifth generation (5G) cellular standard.

Example 24. The device of example 22, wherein the receiver includes a receiver configured to receive the plurality of audio streams in accordance with a personal area network standard.

Example 25. A method comprising: storing, by a memory, the plurality of audio streams and corresponding audio metadata, each of the audio streams representative of a soundfield, and the audio metadata includes capture location information representative of a capture location in a displayed world at which the corresponding one of the plurality of audio streams was captured; outputting, by the one or more processors for display, a graphical user interface including capture device representations associated with coordinates of the displayed world; obtaining, by the one or more processors, an indication representing user input selecting one or more of the capture device representations; and selecting, by the one or more processors and based on the indication, at least one audio stream of the plurality of audio streams.

Example 26. The method of example 25, further comprising reproducing, by the one or more processors, based on the at least one audio stream, the corresponding at least one soundfield.

Example 27. The method of example 25, wherein further comprising outputting, by the one or more processors to a reproduction device, the at least one audio stream or an indication of the at least one audio stream.

Example 28. The method of any combination of examples 25 to 27, wherein further comprising combining, by the one or more processors, at least two audio streams based on the indication representing the user input selecting the one or more of the capture device representations.

Example 29. The method of example 28, wherein combining the at least two audio streams comprises mixing the at least two audio streams or interpolating a third audio stream based on the at least two audio streams.

Example 30. The method of any combination of examples 25 to 29, wherein the capture device representations comprise at least one of icons, images, or alphanumeric representations corresponding to the capture device.

Example 31. The method of any combination of examples 25 to 30, wherein the capture device representations correspond to respective devices used to capture corresponding audio streams.

Example 32. The method of example 31, wherein the capture device representations are arranged in the graphical user interface with a spatial relationship representing relative positions of the respective devices used to capture the corresponding audio streams.

Example 33. The method of any combination of examples 25 to 32, wherein the indication representing the user input represents a user input selecting a plurality of the capture device representations.

Example 34. The method of any combination of examples 32 to 33, wherein the indication representing the user input represents a user input defining a zone around a plurality of capture device representations, wherein the zone is associated with coordinates of the displayed world.

Example 35. The method of any combination of examples 31 to 34, further comprising obtaining, by the one or more processors, an user input indication representing an importance assigned to a respective device or zone associated with coordinates of the displayed world, and wherein the importance indicates a relative gain applied to the audio streams associated with the respective device or zone.

Example 36. The method of any combination of examples 25 to 35, further comprising: obtaining, by the one or more processors, an indication representing a desired listening position; and reproducing, by the one or more processors, the corresponding at least one soundfield based on the listening position.

Example 37. The method of example 36, wherein further comprising outputting, by the one or more processors, in response to obtaining the indication representing the desired listening position, a graphical user interface element suggesting an alternative listening position.

Example 38. The method of any combination of examples 25 to 37, further comprising: obtaining, by the one or more processors, an indication indicating a relative perspective of a listening experience; determining, by the one or more processors, virtual location information representative of a virtual location of the device in the displayed world; and selecting, by the one or more processors, based on the virtual location information, the capture location information, and the indication indicating the relative perspective of the listening experience, the at least one audio stream.

Example 39. The method of any combination of examples 25 to 38, further comprising obtaining, by the one or more processors, an indication indicating a toggle of display of metadata associated with the capture locations.

Example 40. The method of example 39, wherein, when the metadata is output for display, the capture device representations comprise augmented labels of the metadata, and wherein the indication representing the user input selecting one or more of the capture device representations comprising an indication representing a single touch impression on a display device communicatively coupled to the one or more processors, a multi-touch impression on the display device, a gesture on the display device, or a voice command.

Example 41. The method of any combination of examples 25 to 40, further comprising obtaining, by the one or more processors, an user input indication indicating a toggle of display of an energy map with the capture locations.

Example 42. The method of any combination of examples 25 to 41, wherein the device comprises an extended reality headset, and wherein the displayed world comprises a visual scene represented by video data captured by a camera.

Example 43. The method of any combination of example 25 to 42, wherein the device comprises an extended reality headset, and wherein the displayed world comprises a virtual world.

Example 44. The method of any combination of examples 25 to 43, wherein a head-mounted display is configured to present the displayed world and the graphical user interface.

Example 45. The method of any combination of examples 25 to 43, wherein a mobile handset is configured to present the displayed world and the graphical user interface.

Example 46. The method of any combination of examples 25 to 45, further comprising receiving, by a receiver, the plurality of audio streams.

Example 47. The method of example 46, wherein the receiver includes a receiver configured to receive the plurality of audio streams in accordance with a fifth generation (5G) cellular standard.

Example 48. The device of example 46, wherein the receiver includes a receiver configured to receive the plurality of audio streams in accordance with a personal area network standard.

Example 49. A device configured to play one or more of a plurality of audio streams, the device comprising: means for storing the plurality of audio streams and corresponding audio metadata, each of the audio streams representative of a soundfield, and the audio metadata includes capture location information representative of a capture location in a displayed world at which the corresponding one of the plurality of audio streams was captured by a corresponding capture device; means for outputting for display a graphical user interface including capture device representations associated with coordinates of the displayed world; means for obtaining an indication representing user input selecting one or more of the capture device representations; and means for selecting, based on the indication, at least one audio stream of the plurality of audio streams.

Example 50. The device of example 49, further comprising means for reproducing, based on the at least one audio stream, the corresponding at least one soundfield.

Example 51. The device of example 49, wherein further comprising means for outputting, to a reproduction device, the at least one audio stream or an indication of the at least one audio stream.

Example 52. The device of any combination of examples 49 to 51, wherein further comprising means for combining at least two audio streams based on the indication representing the user input selecting the one or more of the capture device representations.

Example 53. The device of example 52, wherein the means for combining the at least two audio streams comprises means for mixing the at least two audio streams or means for interpolating a third audio stream based on the at least two audio streams.

Example 54. The device of any combination of examples 49 to 53, wherein the capture device representations comprise at least one of icons, images, or alphanumeric representations corresponding to the capture device.

Example 55. The device of any combination of examples 49 to 54, wherein the capture device representations correspond to respective devices used to capture corresponding audio streams.

Example 56. The device of example 55, wherein the capture device representations are arranged in the graphical user interface with a spatial relationship representing relative positions of the respective devices used to capture the corresponding audio streams.

Example 57. The device of any combination of examples 49 to 56, wherein the indication representing the user input represents a user input selecting a plurality of the capture device representations.

Example 58. The device of any combination of examples 56 to 57, wherein the indication representing the user input represents a user input defining a zone around a plurality of capture device representations, wherein the zone is associated with coordinates of the displayed world.

Example 59. The device of any combination of examples 55 to 58, further comprising means for obtaining an user input indication representing an importance assigned to a respective device or zone associated with coordinates of the displayed world, and wherein the importance indicates a relative gain applied to the audio streams associated with the respective device or zone.

Example 60. The device of any combination of examples 49 to 59, further comprising: means for obtaining an indication representing a desired listening position; and means for reproducing the corresponding at least one soundfield based on the listening position.

Example 61. The device of example 60, wherein further comprising means for outputting, in response to obtaining the indication representing the desired listening position, a graphical user interface element suggesting an alternative listening position.

Example 62. The device of any combination of examples 49 to 61, further comprising: means for obtaining an indication indicating a relative perspective of a listening experience; means for determining virtual location information representative of a virtual location of the device in the displayed world; and means for selecting based on the virtual location information, the capture location information, and the indication indicating the relative perspective of the listening experience, the at least one audio stream.

Example 63. The device of any combination of examples 49 to 62, further comprising means for obtaining an indication indicating a toggle of display of metadata associated with the capture locations.

Example 64. The device of example 63, wherein, when the metadata is output for display, the capture device representations comprise augmented labels of the metadata, and wherein the indication representing the user input selecting one or more of the capture device representations comprising an indication representing a single touch impression on a display device communicatively coupled to the one or more processors, a multi-touch impression on the display device, a gesture on the display device, or a voice command.

Example 65. The device of any combination of examples 49 to 64, further comprising means for obtaining an user input indication indicating a toggle of display of an energy map with the capture locations.

Example 66. The device of any combination of examples 49 to 65, wherein the device comprises an extended reality headset, and wherein the displayed world comprises a visual scene represented by video data captured by a camera.

Example 67. The device of any combination of example 49 to 65, wherein the device comprises an extended reality headset, and wherein the displayed world comprises a virtual world.

Example 68. The device of any combination of examples 49 to 65, further comprising a head-mounted display configured to present the displayed world and the graphical user interface.

Example 69. The device of any combination of examples 49 to 65, wherein the device comprises a mobile handset.

Example 70. The device of any combination of examples 49 to 69, further comprising means for receiving the plurality of audio streams.

Example 71. The device of example 70, wherein the means for receiving comprises means for receiving the plurality of audio streams in accordance with a fifth generation (5G) cellular standard.

Example 72. The device of example 70, wherein the means receiving comprises means for receiving the plurality of audio streams in accordance with a personal area network standard.

Example 73. A non-transitory computer-readable storage medium having stored thereon instructions that, when executed, cause one or more processors to: store the plurality of audio streams and corresponding audio metadata, each of the audio streams representative of a soundfield, and the audio metadata includes capture location information representative of a capture location in a displayed world at which the corresponding one of the plurality of audio streams was captured by a corresponding capture device; and output, for display, a graphical user interface including capture device representations associated with coordinates of the displayed world; obtain an indication representing user input selecting one or more of the capture device representations; and select, based on the indication, at least one audio stream of the plurality of audio streams.

Example 74. A device configured to play one or more of a plurality of audio streams, the device comprising: a memory configured to store the plurality of audio streams and corresponding audio metadata, each of the audio streams representative of a soundfield, and the audio metadata includes capture location information representative of a capture location in a displayed world at which the corresponding one of the plurality of audio streams was captured by a corresponding capture device; and one or more processors coupled to the memory, and configured to: output, for display, a graphical user interface comprising capture device representations associated with coordinates of the displayed world; obtain an indication representing a user input selecting a location within the graphical user interface; set, based on the indication, an audio source distance threshold; and select, based on the audio source distance threshold, at least one audio stream of the plurality of audio streams.

Example 75. The device of example 74, wherein the one or more processors are further configured to reproduce, based on the at least one audio stream, the corresponding at least one soundfield.

Example 76. The device of example 74 or 75, wherein the one or more processors is further configured to output, to a reproduction device, the at least one audio stream or an indication of the at least one audio stream.

Example 77. The device of any combination of examples 74-76, wherein the one or more processors are further configured to obtain an indication from the user that the user desires to activate a snapping mode.

Example 78. The device of example 77, wherein the snapping mode is a hard snapping mode or a soft snapping mode.

Example 79. The device of example 78, wherein the snapping mode is the soft snapping mode, the audio source distance threshold is a first audio source distance threshold, the indication is a first indication and the location is a first location, and the one or more processors are further configured to: obtain a second indication representing a user input selecting a second location within the graphical user interface; and set, based on the second indication, a second audio source distance threshold; and select, based on the second audio source distance threshold, at least one audio stream of the plurality of audio streams.

Example 80. The device of example 79, wherein the at least one audio streams comprise two audio streams and the one or more processors are further configured to combine the two audio streams.

Example 81. The device of example 80, wherein the one or more processors are configured to combine the two audio streams by at least one of adaptive mixing the two audio streams or interpolating a third audio stream based on the two audio streams.

Example 82. The device of example 80 or 81, wherein the one or more processors are configured to combine the two audio streams by applying a function F(x) to the two audio streams.

Example 83. The device of any combination of examples 74-79, wherein the at least one audio stream is a single audio stream.

Example 84. The device of any combination of examples 74-83, wherein the one or more processors are further configured to: change the audio source distance threshold based on the indication.

Example 85. The device of any combination of example 74-84, wherein the device comprises an extended reality headset, and wherein the displayed world comprises a virtual world.

Example 86. The device of any combination of examples 74-85, further comprising a head-mounted display configured to present the displayed world and the graphical user interface.

Example 87. The device of any combination of examples 74-86, wherein the device comprises a mobile handset.

Example 88. The device of any combination of examples 74-87, further comprising a receiver configured to receive the plurality of audio streams.

Example 89. The device of example 88, wherein the receiver includes a receiver configured to receive the plurality of audio streams in accordance with a fifth generation (5G) cellular standard.

Example 90. The device of example 88, wherein the receiver includes a receiver configured to receive the plurality of audio streams in accordance with a personal area network standard.

Example 91. A method comprising: storing, by a memory, the plurality of audio streams and corresponding audio metadata, each of the audio streams representative of a soundfield, and the audio metadata includes capture location information representative of a capture location in a displayed world at which the corresponding one of the plurality of audio streams was captured; outputting, by the one or more processors for display, a graphical user interface including capture device representations associated with coordinates of the displayed world; obtaining, by the one or more processors, an indication representing a user input selecting a location within the graphical user interface; and setting, by the one or more processors and based on the indication, an audio source distance threshold; and selecting, by the one or more processors and based on the audio source distance threshold, at least one audio stream of the plurality of audio streams.

Example 92. The method of example 91, further comprising reproducing, by the one or more processors, based on the at least one audio stream, the corresponding at least one soundfield.

Example 93. The method of example 91 or 92, further comprising outputting, to a reproduction device, the at least one audio stream or an indication of the at least one audio stream.

Example 94. The method of any combination of examples 91-93, further comprising obtaining, by the one or more processors, an indication from the user that the user desires to activate a snapping mode.

Example 95. The method of example 94, wherein the snapping mode is a hard snapping mode or a soft snapping mode.

Example 96. The method of example 95, wherein the snapping mode is the soft snapping mode, the audio source distance threshold is a first audio source distance threshold, the indication is a first indication and the location is a first location, the method further comprising: obtaining, by the one or more processors, a second indication representing a user input selecting a second location within the graphical user interface; setting, by the one or more processors and based on the second indication, a second audio source distance threshold; and selecting, by the one or more processors and based on the second audio source distance threshold, at least one audio stream of the plurality of audio streams.

Example 97. The method of example 96, wherein the at least one audio streams comprise two audio streams and the method further comprises combining, by the one or more processors, the two audio streams.

Example 98. The method of example 97, wherein the combining comprises at least one of adaptive mixing the two audio streams or interpolating a third audio stream based on the two audio streams.

Example 99. The method of example 97 or 98, wherein the combining comprises applying a function F(x) to the two audio streams.

Example 100. The method of any combination of examples 91-96, wherein the at least one audio stream is a single audio stream.

Example 101. The method of any combination of examples 91-100, further comprising: changing, by the one or more processors, the audio source distance threshold based on the indication.

Example 102. A non-transitory computer-readable storage medium having stored thereon instructions that, when executed, cause one or more processors to: store a plurality of audio streams and corresponding audio metadata, each of the audio streams representative of a soundfield, and the audio metadata includes capture location information representative of a capture location in a displayed world at which the corresponding one of the plurality of audio streams was captured by a corresponding capture device; output, for display, a graphical user interface including capture device representations associated with coordinates of the displayed world; obtain an indication representing a user input selecting a location within the graphical user interface; set, based on the indication, an audio source distance threshold; and select, based on the audio source distance threshold, at least one audio stream of the plurality of audio streams.

Example 103. A device comprising: means for storing a plurality of audio streams and corresponding audio metadata, each of the audio streams representative of a soundfield, and the audio metadata includes capture location information representative of a capture location in a displayed world at which the corresponding one of the plurality of audio streams was captured; means for outputting a graphical user interface including capture device representations associated with coordinates of the displayed world; means for obtaining an indication representing a user input selecting a location within the graphical user interface; means for setting an audio source distance threshold; and means for selecting, based on the audio source distance threshold, at least one audio stream of the plurality of audio streams.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device configured to play one or more of a plurality of audio streams, the device comprising:
   a memory configured to store the plurality of audio streams, each of the audio streams representative of a soundfield; and
   one or more processors coupled to the memory, and configured to:
   present a user interface to a user;
   obtain a first indication from the user via the user interface representing a desired listening position;
   select, based on the first indication, a first at least one audio stream of the plurality of audio streams;
   obtain a second indication from the user via the user interface representing an audio source distance threshold, the audio source distance threshold being representative of a distance from an audio source associated with the desired listening position;
   determine that the user is moving from one location to another location;
   determine an audio source distance as a distance between the audio source and a virtual location of the user;
   compare the audio source distance to the audio source distance threshold;
   based on the audio source distance being greater than the audio source distance threshold, select, a second at least one audio stream of the plurality of audio streams, wherein the second at least one audio stream is not identical to the first at least one audio stream.

2. The device of claim 1, wherein the memory is further configured to store location information associated with coordinates of an acoustical space in which a corresponding one of the plurality of audio streams was captured or synthesized.

3. The device of claim 2, wherein the user interface comprises one or more of a graphical user interface, a gesture-based user interface, a voice command-based user interface, a touch-based user interface.

4. The device of claim 3, wherein the user interface is configured to obtain user input in at least one of single touch, multi-touch, gesture, voice command, or tap.

5. The device of claim 3, wherein the user interface comprises the graphical user interface, and the graphical user interface comprises representations associated with coordinates of the acoustical space in which the plurality of audio streams were captured or synthesized.

6. The device of claim 5, wherein the representations are arranged in the graphical user interface with a spatial relationship representing relative positions of the coordinates of the acoustical space in which the plurality of audio streams were captured or synthesized.

7. The device of claim 6, wherein the one or more processors is further configured to, in response to obtaining the first indication representing the desired listening position, output, for display, a graphical user interface element suggesting an alternative listening position.

8. The device of claim 1, wherein the one or more processors is further configured to combine at least two audio streams based on the first indication by at least one of mixing the at least two audio streams or interpolating a third audio stream based on the at least two audio streams.

9. The device of claim 1, wherein the one or more processors are further configured to obtain via the user interface an importance indication representing an importance assigned to an audio stream, and wherein the importance indicates a relative gain to be applied to the audio stream.

10. The device of claim 1, wherein the one or more processors are further configured to set, based on the second indication, the audio source distance threshold.

11. The device of claim 1, wherein the one or more processors are further configured to obtain a third indication, via the user interface, from the user that the user desires to activate a snapping mode, the snapping mode being configured to transform spatial coordinates for audio rendering based on a present location of the user and at least one audio source distance threshold.

12. The device of claim 11, wherein the snapping mode is a hard snapping mode including a single audio source distance threshold or a soft snapping mode including two audio source distance thresholds.

13. The device of claim 12, wherein the audio source distance threshold is a first audio source distance threshold and wherein the one or more processors are further configured to:
   determine a second audio source distance threshold, and wherein the one or more processors are configured to
   select the second at least one audio stream of the plurality of audio streams, further based on the second audio source distance threshold.

14. The device of claim 13, wherein the one or more processors are configured to combine the two audio streams by applying a function F(x) to the two audio streams.

15. The device of claim 1,
wherein the device comprises an extended reality headset, and
wherein a displayed world comprises a visual scene represented by video data captured by a camera.

16. The device of claim 1,
wherein the device comprises an extended reality headset, and
wherein a displayed world comprises a virtual world.

17. The device of claim 1, wherein the device comprises a mobile handset.

18. The device of claim 1, wherein the device further comprises a wireless transceiver, the wireless transceiver being coupled to the one or more processors and being configured to receiver a wireless signal, wherein the wireless signal comprises at least one of Bluetooth, or Wi-Fi, or conforms to a fifth generation (5G) cellular protocol.

19. A method comprising:
storing, by a memory, a plurality of audio streams, each of the audio streams representative of a soundfield, the memory being communicatively coupled to one or more processors;
presenting, by the one or more processors, a user interface to a user;
obtaining, by the one or more processors, from the user via the user interface, a first indication representing a desired listening position;
selecting, based on the first indication, a first at least one audio stream of the plurality of audio streams;
obtaining, by the one or more processors, from the user via the user interface, a second indication representing an audio source distance threshold, the audio source distance threshold being representative of a distance from an audio source associated with the desired listening position;
determining that the user is moving from one location to another location;
determining an audio source distance as a distance between the audio source and a virtual location of the user;
comparing the audio source distance to the audio source distance threshold; and
based on the audio source distance being greater than the audio source distance threshold, selecting, by the one or more processors, a second at least one audio stream of the plurality of audio streams, wherein the second at least one audio stream is not identical to the first at least one audio stream.

20. The method of claim 19, further comprising storing location information associated with coordinates of an acoustical space in which a corresponding one of the plurality of audio streams was captured or synthesized.

21. The method of claim 20, wherein the user interface comprises one or more of a graphical user interface, a gesture-based user interface, a voice command-based user interface, a touch-based user interface.

22. The method of claim 21, further comprising, obtaining, by the one or more processors, via the user interface, user input, the user input comprising at least one of single touch, multi-touch, gesture, voice command, or tap.

23. The method of claim 21, wherein the user interface comprises the graphical user interface, and the graphical user interface comprises representations associated with coordinates of the acoustical space in which the plurality of audio streams were captured or synthesized.

24. The method of claim 23, wherein the representations are arranged in the graphical user interface with a spatial relationship representing relative positions of the coordinates of the acoustical space in which the plurality of audio streams were captured or synthesized.

25. The method of claim 24, further comprising outputting, in response to obtaining the first indication representing the desired listening position, and for display, a graphical user interface element suggesting an alternative listening position.

26. The method claim 19, further comprising combining, by the one or more processors, at least two audio streams based on the first indication by at least one of mixing the at least two audio streams or interpolating a third audio stream based on the at least two audio streams.

27. The method of claim 19, further comprising, obtaining, by the one or more processors via the user interface an importance indication representing an importance assigned to an audio stream, and wherein the importance indicates a relative gain to be applied to the audio stream.

28. The method of claim 19, further comprising setting, by the one or more processors, and based on the second indication, the audio source distance threshold.

29. The method of claim 28, further comprising obtaining, by the one or more processors via the user interface, a third indication from the user that the user desires to activate a snapping mode, the snapping mode being configured to transform spatial coordinates for audio rendering based on a present location of the user and at least one audio source distance threshold.

30. The method of claim 29, wherein the snapping mode is a hard snapping mode including a single audio source distance threshold or a soft snapping mode including two audio source distance thresholds.

31. The method of claim 30, wherein the audio source distance threshold is a first audio source distance threshold, the method further comprising:
determining, by the one or more processors via the user interface, a second audio source distance threshold,
wherein the selecting the second at least one audio stream of the plurality of audio streams is further based on the second audio source distance threshold.

32. The method of claim 31, wherein the one or more processors are configured to combine the two audio streams by applying a function F(x) to the two audio streams.

33. The method of claim 19, wherein the method is performed by an extended reality headset, and wherein a displayed world comprises a visual scene represented by video data captured by a camera.

34. The method of claim 19, wherein the method is performed on an extended reality headset, and wherein a displayed world comprises a virtual world.

35. The method of claim 19, wherein the method is performed on a mobile handset.

36. The method of claim 19, further comprising receiving, by a wireless transceiver, a wireless signal, wherein the wireless signal comprises at least one of a Bluetooth signal, a Wi-Fi signal, or a signal in accordance with a fifth generation (5G) cellular standard.

37. A device configured to play one or more of a plurality of audio streams, the device comprising:
means for storing the plurality of audio streams, each of the audio streams representative of a soundfield;
means for presenting a user interface to a user;

means for obtaining, from a user via the user interface, a first indication representing a desired listening position;
means for selecting, based on the first indication, a first at least one audio stream of the plurality of audio streams;
means for obtaining, from the user via the user interface, a second indication representing an audio source distance threshold, the audio source distance threshold being representative of a distance from an audio source associated with the desired listening position; and
means for determining that the user is moving from one location to another location;
means for determining an audio source distance as a distance between the audio source and a virtual location of the user;
means for comparing the audio source distance to the audio source distance threshold; and
means for selecting, based on the audio source distance being greater than the audio source distance threshold, a second at least one audio stream of the plurality of audio streams, wherein the second at least one audio stream is not identical to the first at least one audio stream.

38. A non-transitory computer-readable storage medium having stored thereon instructions that, when executed, cause one or more processors to:

store a plurality of audio streams, each of the audio streams representative of a soundfield;
present a user interface to a user;
obtain, via the user interface from the user, a first indication representing a desired listening position;
select, based on the first indication, a first at least one audio stream of the plurality of audio streams;
obtain, via the user interface from the user, a second indication representing an audio source distance threshold, the audio source distance threshold being representative of a distance from an audio source associated with the desired listening position;
determine that the user is moving from one location to another location;
determine an audio source distance as a distance between the audio source and a virtual location of the user;
compare the audio source distance to the audio source distance threshold; and
based on the audio source distance being greater than the audio source distance threshold, select, based on the first indication and the second indication, a second at least one audio stream of the plurality of audio streams, wherein the second at least one audio stream is not identical to the first at least one audio stream.

* * * * *